US012719172B2

(12) United States Patent
Goldberg et al.

(10) Patent No.: US 12,719,172 B2
(45) Date of Patent: Aug. 25, 2026

(54) AERIAL VEHICLE HAVING ANTENNA ASSEMBLIES, ANTENNA ASSEMBLIES, AND RELATED METHODS AND COMPONENTS

(71) Applicant: Northrop Grumman Systems Corporation, Falls Church, VA (US)

(72) Inventors: Mark Russell Goldberg, Simi Valley, CA (US); Harold Kregg Hunsberger, Simi Valley, CA (US); Helen J. Mills, Northridge, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 19/049,837

(22) Filed: Feb. 10, 2025

(65) Prior Publication Data

US 2025/0183543 A1 Jun. 5, 2025

Related U.S. Application Data

(60) Continuation of application No. 18/457,223, filed on Aug. 28, 2023, now Pat. No. 12,224,491, which is a (Continued)

(51) Int. Cl.
*H01Q 13/08* (2006.01)
*H01Q 1/28* (2006.01)
*H01Q 21/06* (2006.01)

(52) U.S. Cl.
CPC ........... *H01Q 13/085* (2013.01); *H01Q 1/281* (2013.01); *H01Q 21/064* (2013.01)

(58) Field of Classification Search
CPC .......... H01Q 1/02; H01Q 1/281; H01Q 1/405; H01Q 11/105; H01Q 13/085; H01Q 21/064; H01Q 21/20
See application file for complete search history.

(56) References Cited

U.S. PATENT DOCUMENTS 4,779,064 A 10/1988 Monser
6,703,975 B1 * 3/2004 Freeman ................ H01Q 1/286 343/705
(Continued)

FOREIGN PATENT DOCUMENTS

CN 106025511 A 10/2016
CN 107086362 A 8/2017
(Continued)

OTHER PUBLICATIONS

Deng et al. "A novel Microstrip slot Antenna" 2008 4th International Conference On Wireless Communications, Networking and Mobile Computing, WICOM'08, Oct. 12-14, 2008, [Online] Nov. 18, 2008 (Nov. 18, 2008), pp. 1-3.
(Continued)

*Primary Examiner* — Hoang V Nguyen
(74) *Attorney, Agent, or Firm* — Dority & Manning, P.A.

(57) ABSTRACT

An aerial vehicle includes a body and an antenna assembly mounted to the body. The antenna assembly includes a fairing component comprising a hollow body, a conductive coating formed on at least an inner surface of the fairing component, a plurality of antenna elements formed in the conductive coating, each antenna element including a first slot line defining a first transmission line and a second slot line defining a second transmission line, an insulator sleeve disposed within the fairing component, wherein an outer surface of the insulator sleeve at least substantially matches an inner surface of the fairing component, and a plurality of cable assemblies operably coupled to the plurality of antenna elements, wherein each cable assembly is coupled to a respective antenna element.

2 Claims, 19 Drawing Sheets

Related U.S. Application Data continuation of application No. 17/700,989, filed on Mar. 22, 2022, now Pat. No. 11,742,582, which is a division of application No. 16/894,057, filed on Jun. 5, 2020, now Pat. No. 11,283,178.

(60) Provisional application No. 63/001,151, filed on Mar. 27, 2020.

(56) References Cited

U.S. PATENT DOCUMENTS

| | | | |
|---|---|---|---|
| 7,583,233 | B2 | 9/2009 | Goldberg et al. |
| 7,922,529 | B1 | 4/2011 | Meurer |
| 8,765,230 | B1 | 7/2014 | Waldrop, III et al. |
| 11,572,963 | B2 | 2/2023 | Feng et al. |
| 2003/0082942 | A1 | 5/2003 | Wlos |
| 2008/0007471 | A1 | 1/2008 | Goldberg et al. |
| 2008/0316124 | A1 | 12/2008 | Hook |
| 2012/0181374 | A1 | 7/2012 | Williams |
| 2013/0330967 | A1 | 12/2013 | Youtsey |
| 2015/0083860 | A1 | 3/2015 | Frauen et al. |
| 2015/0132989 | A1 | 5/2015 | Wang et al. |
| 2017/0167838 | A1 | 6/2017 | Quertelet |

FOREIGN PATENT DOCUMENTS

| | | | |
|---|---|---|---|
| CN | 209088229 | U | 7/2019 |
| CN | 110311217 | A | 10/2019 |
| CN | 111311217 | A | 10/2019 |
| CN | 109428242 | B | 5/2020 |
| DE | 102013110684 | A1 | 3/2015 |
| FR | 2756976 | A1 | 6/1998 |
| JP | 2004-197592 | A | 7/2004 |
| KR | 10-1667969 | B1 | 10/2016 |

OTHER PUBLICATIONS

European Communication pursuant to Article 94(3) EPC for European Application No. 21714088.8, dated Sep. 3, 2024, 9 pages.

India Patent Examination Report for India Application No. 202217060805, dated Jan. 15, 2024, 7 pages with English translation.

International Communication Relating to the Results of the Partial International Search for International Application No. PCT/US2021/020885, mailed Jun. 9, 2021, 3 pages.

International Provisional Opinion Accompanying the Partial Search Result for International Application No. PCT/US2021/020885, mailed Jun. 9, 2021, 13 pages.

International Search Report for International Application No. PCT/US2021/020885, mailed Aug. 13, 2021, 7 pages.

International Written Opinion for International Application No. PCT/US2021/020885, mailed Aug. 13, 2021, 15 pages.

Japanese Notice of Reasons for Refusal for Japanese Application No. 2022-558503, dated Dec. 26, 2023, 5 pages with English translation.

New Zealand Patent Examination Report 1 for the New Zealand Patent Application No. 793260 , dated Apr. 3, 2024, 4 pages.

Nurnberger et al. "Analysis of a log-periodic folded slot antenna array on planar and cylindrical platforms" University of Michigan Research Paper (2006) pp. 1282-1285.

Qian et al. "Simulation and Analysis of LPFSA Loaded with Split-Ring Resonators" 2019 International Applied Computational Electromagnetics Society Symposium—China (ACES), Applied Computational Electromagnetics Society, vol. 1, Aug. 8, 2019 (Aug. 8, 2019), pp. 1-2.

Ukrainian Patent Examination Report for Ukrainian Patent Application No. 202203794, dated Jan. 21, 2025, 10 pages with English machine translation.

United Arab Emirates Patent Examination and Search Report for United Arab Emirates Patent Application No. P6001985 2022 , dated Nov. 4, 2024, 10 pages.

Wang et al. "A conformal log-period folded-slot antenna with reduced size", 2013 IEEE Antennas and Propagation Society International Symposium (APSURSI), IEEE, Jul. 7, 2013 (Jul. 7, 2013), pp. 890-891.

* cited by examiner

AERIAL VEHICLE HAVING ANTENNA ASSEMBLIES, ANTENNA ASSEMBLIES, AND RELATED METHODS AND COMPONENTS

CROSS-REFERENCE TO RELATED APPLICATIONS

This application is a continuation of U.S. patent application Ser. No. 18/457,223, filed Aug. 28, 2023, now U.S. Pat. No. 12,224,491, issued Feb. 11, 2025, which is a continuation of U.S. patent application Ser. No. 17/700,989, filed Mar. 22, 2022, now U.S. Pat. No. 11,742,582, issued Aug. 29, 2023, and which is a divisional of U.S. patent application Ser. No. 16/894,057, filed Jun. 5, 2020, now U.S. Pat. No. 11,283,178, issued Mar. 22, 2022, which claims the benefit under 35 U.S.C. § 119(e) of U.S. Provisional Patent Application Ser. No. 63/001,151, filed Mar. 27, 2020, the disclosure of each of which is hereby incorporated herein in its entirety by this reference.

TECHNICAL FIELD

Embodiments of the disclosure relate generally to antenna assemblies for aerial vehicles. More particularly, embodiments of the disclosure relate to antenna assemblies having planar waveguides and coaxial to planar transitions, and related methods of fabrication and components.

BACKGROUND

Log-periodic antennas are typically characterized as having logarithmic-periodic, electrically conducting, elements that may receive and/or transmit communication signals where the relative dimensions of each dipole antenna element and the spacing between elements are logarithmically related to the frequency range over which the antenna operates. Log-periodic dipole antennas may be fabricated using printed circuit boards where the elements of the antenna are fabricated in, conformal to, or on, a surface layer of an insulating substrate. The antenna elements are typically formed on a common plane of a substrate such that the principal beam axis, or direction of travel for the phase centers for increasing frequency of the antenna, is in the same direction.

However, conventional log-periodic antennas typically lose function or incur physical damage in relatively high temperatures (e.g., above 650° F.). Thus, conventional log-periodic antennas in aerial vehicles travelling through the atmosphere and exposed to relatively high temperatures may incur damage or have function compromised.

BRIEF SUMMARY

Embodiments of the present disclosure include an aerial vehicle including a body and an antenna assembly mounted to the body. The antenna assembly includes a fairing component comprising a hollow body, a conductive coating formed on at least an inner surface of the fairing component, a plurality of antenna elements formed in the conductive coating, an insulator sleeve disposed within the fairing component, wherein an outer surface of the insulator sleeve at least substantially matches an inner surface of the fairing component, and a plurality of cable assemblies operably coupled to the plurality of antenna elements, wherein each cable assembly is coupled to a respective antenna element.

Each antenna element includes a first slot line defining a first transmission line; and a second slot line defining a second transmission line.

Additional embodiment of the present disclosure include an antenna element including a conductive coating formed on opposing sides of a dielectric body, a first slot line formed in the conductive coating and defining a first transmission line, the first slot line comprising a first sinusoidal slot line extending from a origin point and having a changing amplitude and a changing frequency, wherein, in a direction extending from the origin point, the amplitude of the first sinusoidal slot line increases as the frequency decreases, and a second slot line formed in the conductive coating and defining a second transmission line, the second slot line comprising a second sinusoidal slot line extending from the origin point and having a changing amplitude and a changing frequency, wherein, in a direction extending from the origin point, the amplitude of the second sinusoidal slot line increases as the frequency decreases.

Further embodiments of the present disclosure include an antenna assembly, including a hollow fairing component, a conductive coating formed on an inner surface of the fairing component; a plurality of antenna elements formed in the conductive coating, an insulator sleeve disposed within the fairing component, an absorber sleeve disposed within the insulator sleeve, an inner sleeve disposed within the absorber sleeve, a connection ring disposed within the fairing component and abutting the conductive coating, the connection ring defining a plurality of receiving structures, wherein each of the receiving structure is aligned with a launch portion of a respective antenna element, and a plurality of cable assemblies operably coupled to the plurality of antenna elements, wherein each cable assembly is coupled to the respective antenna element and a coaxial to co-planar connection. Each antenna element including a first slot line, and a second slot line connected to the first slot line at a launch portion of the antenna element.

Embodiments of the present disclosure further include a method of forming an antenna assembly, the method including: forming a fairing component comprising a ceramic matrix composite; printing a conductive coating on an inner surface of the fairing component and a portion of an outer surface of the fairing component; and removing a portion of the conductive coating on the inner surface of the fairing component to define a first slot line and a second slot line, the first slot line forming a first transmission line of an antenna element and the second slot line forming a second transmission line of the antenna element.

Some embodiments of the present disclosure include a cable assembly configured to be operably coupled to a semi-planar waveguide. The cable assembly including a front contactor including: an outer contact; an inner contact disposed at least partially within the outer contact and sharing a center longitudinal axis within the outer contact, a first spring element disposed between the outer contact and the inner contact and biasing the inner contact relative to the outer contact in an axial direction, a retaining element for fastening the cable assembly to a body, and a second spring element disposed between at least a portion of the outer contact and at least a portion or the retaining element and biasing the outer contact relative to the retaining element in the axial direction. The cable assembly further including an aft contactor and a coaxial cable extending between and operably coupled to the front contactor and the aft contactor.

DETAILED DESCRIPTION

Figure 1:
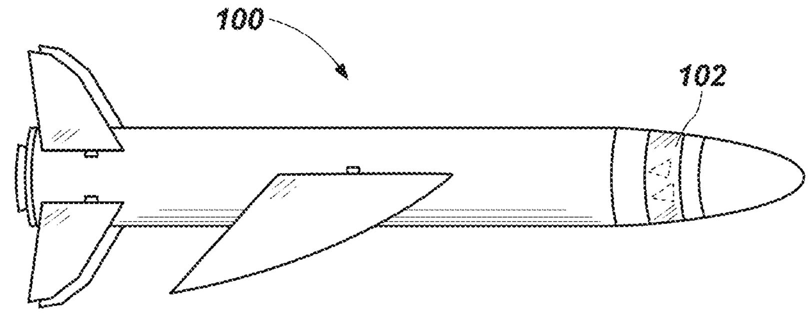
FIG. 1 shows an aerial vehicle having an antenna assembly according to one or more embodiments of the present disclosure.

Illustrations presented herein are not meant to be actual views of any particular aerial vehicle, antenna assembly, waveguide, component, or system, but are merely idealized representations that are employed to describe embodiments of the disclosure. Additionally, elements common between figures may retain the same numerical designation for convenience and clarity.

As used herein, the singular forms following "a," "an," and "the" are intended to include the plural forms as well, unless the context clearly indicates otherwise.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded.

As used herein, any relational term, such as "first," "second," "third," etc., is used for clarity and convenience in understanding the disclosure and accompanying drawings, and does not connote or depend on any specific preference or order, except where the context clearly indicates otherwise.

As used herein, the term "substantially" in reference to a given parameter, property, or condition means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter, as well as variations resulting from manufacturing tolerances, etc.).

Embodiments of the present disclosure include an antenna assembly functional at relatively high temperatures for extended periods of time. For example, antenna assembly of the present disclosure may maintain structural and operational integrity at temperatures of at least 1000° F., 1100° F., 1200° F., or 1500° F. In some embodiments, the antenna assembly may include log-periodic antenna elements. Furthermore, the antenna assembly may include a planar antenna element (e.g., a planar wave guide) operably coupled to a coaxial cable. The antenna element may include a plurality of slot lines formed in a conductive coating. The plurality of slot lines forms transmission lines for the antenna element. Furthermore, the materials and structure of the antenna assembly, as described herein, enable the antenna assembly to maintain structural and operational integrity at relatively high temperatures.

Furthermore, the antenna assembly of the present disclosure may provide advantages over conventional antenna assemblies. For example, because the antenna assembly maintains structural and operational integrity at relatively high temperatures, the antenna assembly increases operational range of vehicles and/or bodies to which the antenna assembly is attached and with which the antenna assembly is utilized. For instance, the vehicles and/or bodies can be subjected to environments having increased temperatures in comparison to conventional antenna assemblies. Furthermore, the antenna assembly may maintain functionality of the antenna assembly, and as a result, radio frequency communication with external components/controllers even when subjected to unexpected high temperatures. As a result, the antenna assembly provides an increased reliability in comparison to conventional antenna assemblies. Moreover, the antenna assembly increases a number of applications (e.g., uses) of the antenna assembly in comparison to conventional antenna assemblies.

FIG. 1 shows an aerial vehicle 100 having a high-temperature, log-periodic antenna assembly 102 (referred to hereinafter as the "antenna assembly 102") according to one or more embodiments of the present disclosure. As is described in greater detail below, the antenna assembly 102 may have a structure and materials combination that enables the antenna assembly 102 to maintain structural and operational integrity at relatively high temperatures for extended periods of time (e.g., several minutes or hours). For example, in some embodiments, the antenna assembly 102 may continue to operate and function in at least 1000° F., 1100° F., 1200° F., or 1500° F. environments or being subjected to any of the foregoing temperatures for extended periods of time. In some embodiments, the aerial vehicle 100 may include one or more of a kill vehicle, an unmanned aerial vehicle, a drone, a missile, and aircraft (e.g., airplane), etc. Additionally, in one or more embodiments, the antenna assembly 102 may be mounted to ground vehicles, marine vehicles, or stationary objects.

Some antenna embodiments of the present invention may be used with a transmitter, a receiver, and/or a transceiver of RF signals. Accordingly, the antenna assemblies 102 of the present disclosure, which are substantially frequency independent, may function as receiving arrays and may alternatively function as a transmitting arrays, or may function as both transmitting and receiving arrays (i.e., a transceiver array).

The antenna assemblies 102 may be electrically connected to a radio frequency receiver system or a radio frequency transmitting and receiving system which may be termed a transceiver (which may be disposed within an interior of the aerial vehicle 100). An RF receiver may process the electric current from the antenna assemblies 102 via a low noise amplifier (LNA) and may then down convert the frequency of the waveform via a local oscillator and mixer and may process the resulting intermediate frequency waveform via an adaptive gain control amplifier circuit. The resulting conditioned waveform may be sampled via an analog-to-digital converter (ADC) with the discrete waveform being processed via a digital signal processing module. Where the frequency of the RF waveform is well within the sampling frequency of the conversion rate of the ADC, direct conversion may be employed and the discrete waveform may be processed at a rate comparable to the ADC rate. Receivers may further include signal processing and/or control logic via digital processing modules having a microprocessor, addressable memory, and machine executable instructions. An RF transmitter may process digital waveforms that have been converted to analog waveforms via a digital-to-analog converter (DAC) and may up-convert the analog waveform via an in-phase/quadrature (I/Q) modulator and/or step up the waveform frequency via a local oscillator and mixer, then amplify the up-converted waveform via a high-power amplifier (HPA) and conduct the amplified waveform as electric current to the antenna. Transmitters may further include signal processing and/or control logic via digital processing modules having a microprocessor, addressable memory, and machine executable instructions. Transceivers generally have the functionality of both a receiver and a transmitter, typically share a component or an analog or digital signal processing module, and employ signal processing and/or control logic via digital processing modules having a microprocessor, addressable memory, and machine executable instructions.

Figure 2:
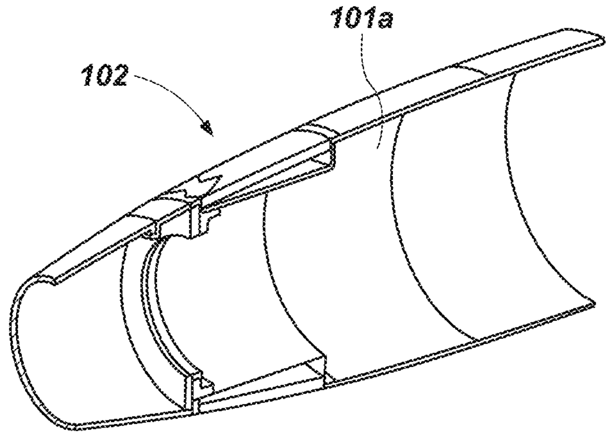
FIG. 2 is a cross-sectional perspective view of the antenna assembly mounted to a first assembly of an aerial vehicle according to one or more embodiments of the present disclosure.
Figure 3:
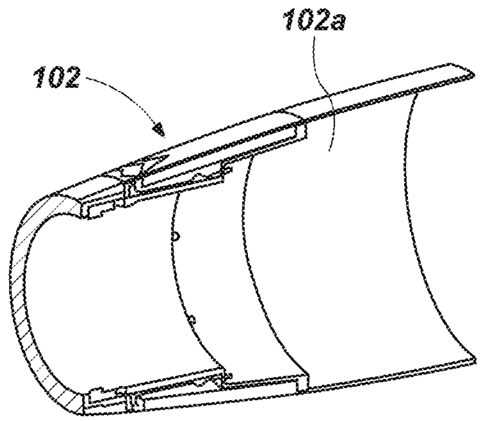
FIG. 3 is a cross-sectional perspective view of the antenna assembly mounted to a second assembly of an aerial vehicle according to one or more embodiments of the present disclosure.

FIG. 2 is a cross-sectional perspective view of the antenna assembly 102 mounted to a first assembly 101*a* of an aerial vehicle according to one or more embodiments of the present disclosure. FIG. 3 is a cross-sectional perspective view of the antenna assembly 102 mounted to a second assembly 102*a* of an aerial vehicle according to one or more embodiments of the present disclosure. As depicted in FIGS. 2 and 3 together, in some embodiments, the antenna assembly 102 may be mounted on or proximate a nose portion of the aerial vehicle 100. In additional embodiments, the antenna assembly 102 may be disposed between the nose portion and a body portion (e.g., a fuselage or body) of the aerial vehicle 100. Furthermore, while particular locations are described herein, the antenna assembly 102 or elements thereof may be disposed anywhere on an aerial vehicle.

Figure 4:
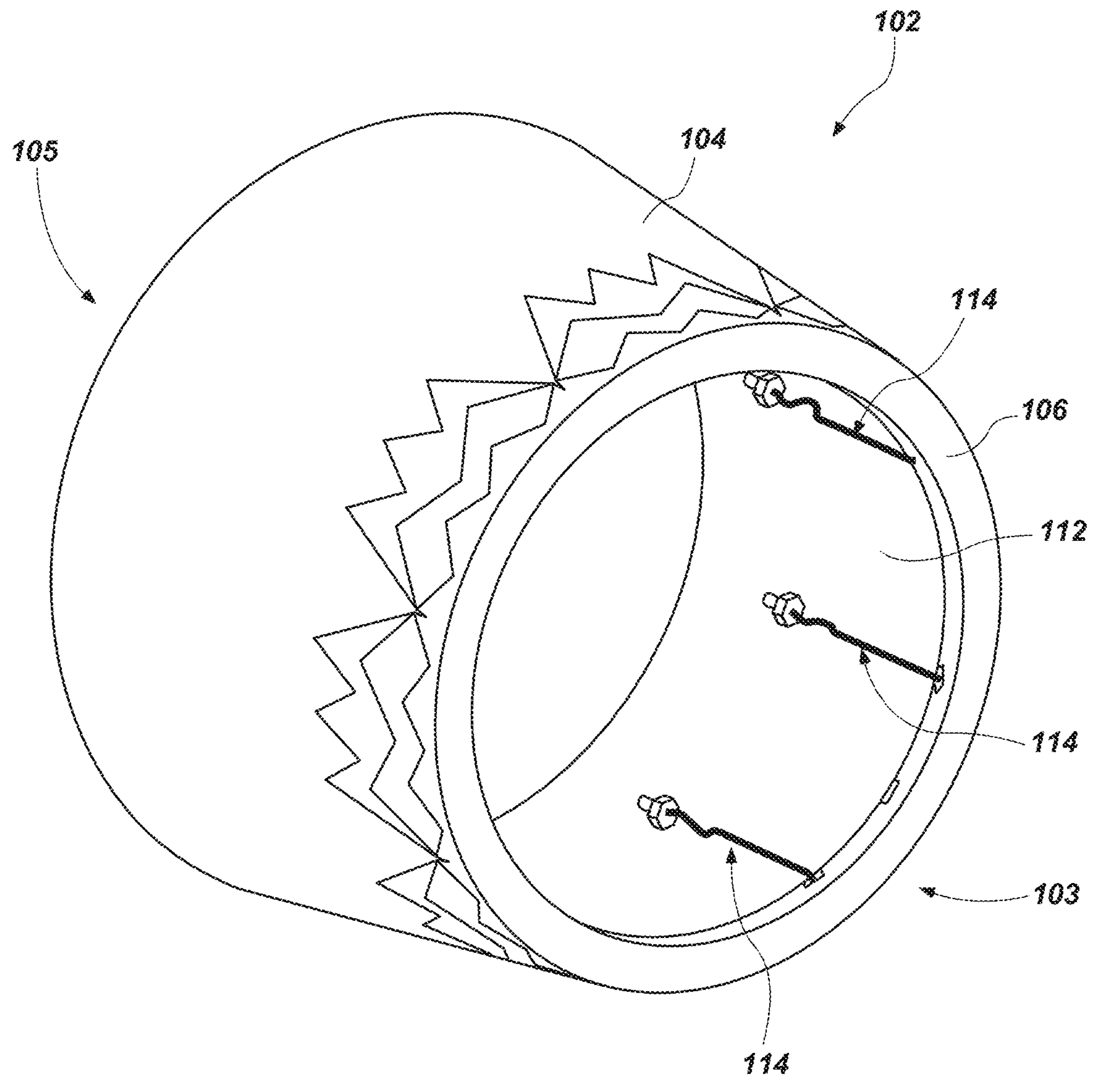
FIG. 4 is a perspective view of the antenna assembly according to one or more embodiments of the present disclosure.
Figure 5:
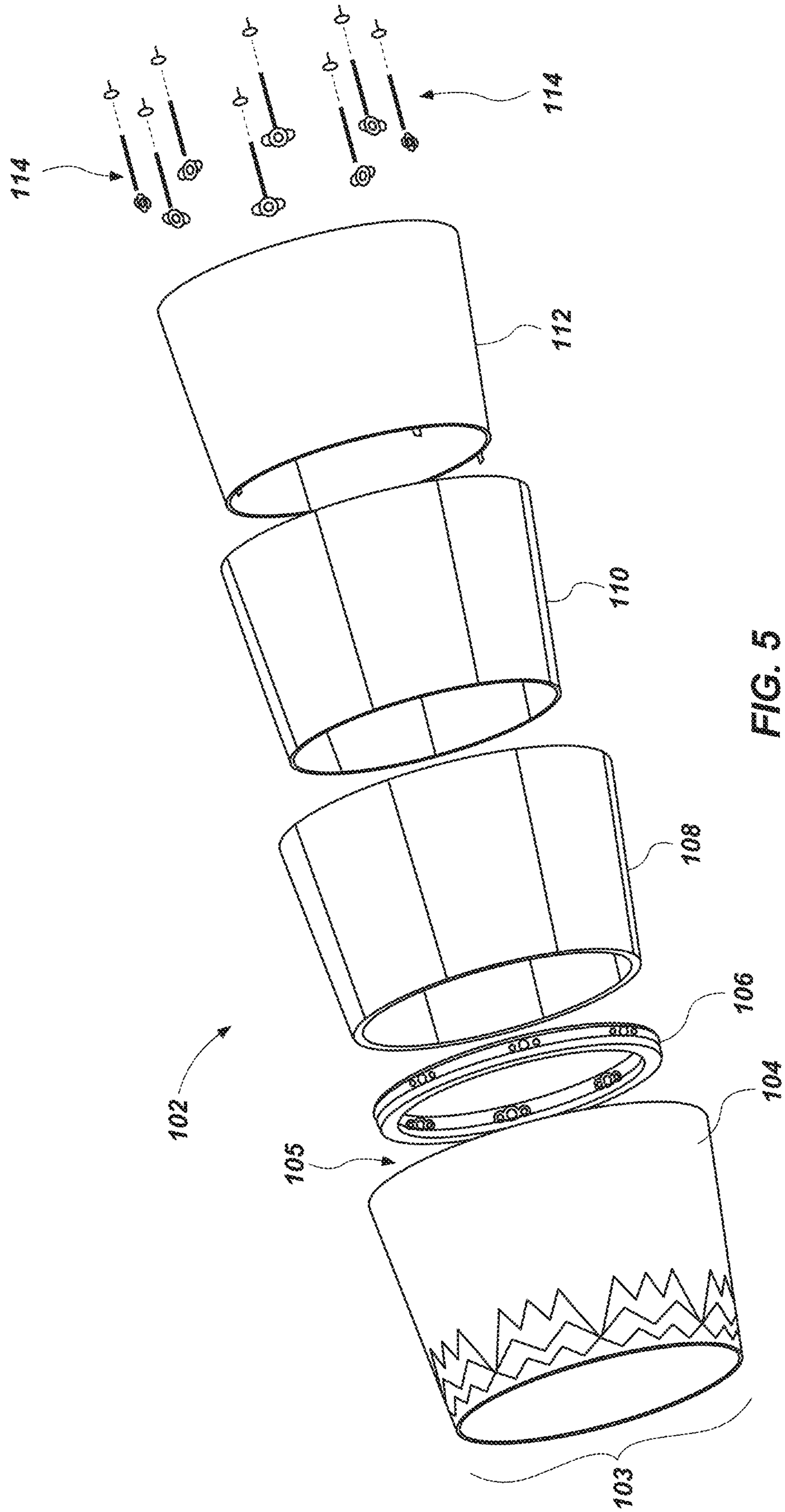
FIG. 5 is an exploded perspective view of the antenna assembly of FIG. 4.

FIG. 4 is a perspective view the antenna assembly 102 according to one or more embodiments of the present disclosure. FIG. 5 is an exploded perspective view of the antenna assembly 102 of FIG. 4. In some embodiments, the antenna assembly 102 may include a fairing component 104, a connection ring 106, an insulator sleeve 108, an absorber sleeve 110, an inner ground sleeve 112 (referred to hereinafter as "inner sleeve 112"), and a plurality of cable assemblies 114.

As is described in greater detail below, in some embodiments, the fairing component 104 may have general hollow, truncated ogive shape and may have a narrow longitudinal end 103 (i.e., front end) and an opposite, wider longitudinal end 105 (e.g., back end). In other embodiments, the fairing component 104 may have a hollow, frusto-conical shape or a hollow cylindrical shape. The connection ring 106 may have a general annular shape and may be disposed (e.g., disposable) within the fairing component 104. In some embodiments, the connection ring 106 may be integral to a housing (e.g., aerial vehicle) to which the antenna assembly 102 is attached. In other embodiments, the connection ring 106 may be separate and distinct from a housing (e.g., aerial vehicle) to which the antenna assembly 102 is attached. Furthermore, a radially outermost surface of the connection ring 106 may be sized and shaped to contact an inner surface of the fairing component 104, as is described in greater detail below. When the connection ring 106 is disposed within the fairing component 104, the radially outermost surface of the connection ring 106 may be generally concentric to the inner surface of the fairing component 104. Moreover, the connection ring 106 may be disposable and attachable within the fairing component 104 at the narrow end 103 of the fairing component 104. Additionally, when attached to the fairing component, the connection ring 106 may be aligned with an edge of the narrow end 103 of the fairing component 104. As is described in greater detail below, the connection ring 106 may further provide connection points for mechanically coupling the plurality of cable assemblies 114 to the fairing component 104.

In some embodiments, the insulator sleeve 108 may also have a truncated ogive shape (or any other shape matching the fairing component 104) and may have a shorter longitudinal length than the fairing component 104. As a result, the insulator sleeve 108 may be disposable within the fairing component 104, may abut against the connection ring 106, and may substantially contact the inner surface of the fairing component 104. For instance, the insulator sleeve 108 may have substantially a same outer diameter as the connection ring 106. As is described in further detail below, the insulator sleeve 108 may at least partially inhibit heat transfer from an exterior of the fairing component 104 to an interior of the antenna assembly and an interior of the aerial vehicle 100. Additionally, in some embodiments, a combination of the longitudinal lengths of the connection ring 106 and the insulator sleeve 108 may be less than a longitudinal length of the fairing component 104 such that a portion of the fairing component 104 extends past the insulator sleeve 108 and forms an overhanging portion 107 that can be bonded to the aerial vehicle 100.

The absorber sleeve 110 may be disposed within the insulator sleeve 108 and may be concentric to the insulator sleeve 108. The absorber sleeve 110 may have a same longitudinal length as the insulator sleeve 108. The absorber sleeve 110 may serve to absorb extraneous or undesired fields in the cavity (e.g., absorb unwanted standing waves) within a particular range of radio frequencies. Additionally, the absorber sleeve 110 may also at least partially inhibit heat transfer from an exterior of the fairing component 104 to an interior of the antenna assembly 102 and the aerial vehicle 100. In some embodiments, the absorber sleeve 110 may have multiple layers, as is described in greater detail below. Furthermore, the absorber sleeve 110 may include a low loss, high resistivity ceramic filler, and a high-temperature thermoplastic matrix, which, by absorbing particular radio frequencies, enables smaller antenna elements of the antenna assembly.

The inner sleeve 112 may be disposed within the absorber sleeve 110 and may be concentric to the absorber sleeve 110. The inner sleeve 112 may provide structural support to the antenna assembly 102 and may at least partially enclose the insulator sleeve 108 and the absorber sleeve 110 and hold the insulator sleeve 108 and the absorber sleeve 110 in place relative to the fairing component 104. The inner sleeve 112 may be fastened to the connection ring 106. For instance, as is described in greater detail below, the inner sleeve 112 may include a plurality of tabs for connecting to the connection ring 106 via fasteners.

The plurality of cable assemblies 114 may be mechanically and electrically coupled to the fairing component 104. Additionally, each of the plurality of cable assemblies 114 may include coaxial cable leading to an interior of the aerial vehicle 100 (e.g., to a controller of the aerial vehicle 100). In some embodiments, the antenna assembly 102 may include at least eight, ten, twelve, or any number of cable assemblies 114. Each of the above elements is described in greater detail below in regard to FIGS. 6-16B.

Figure 6:
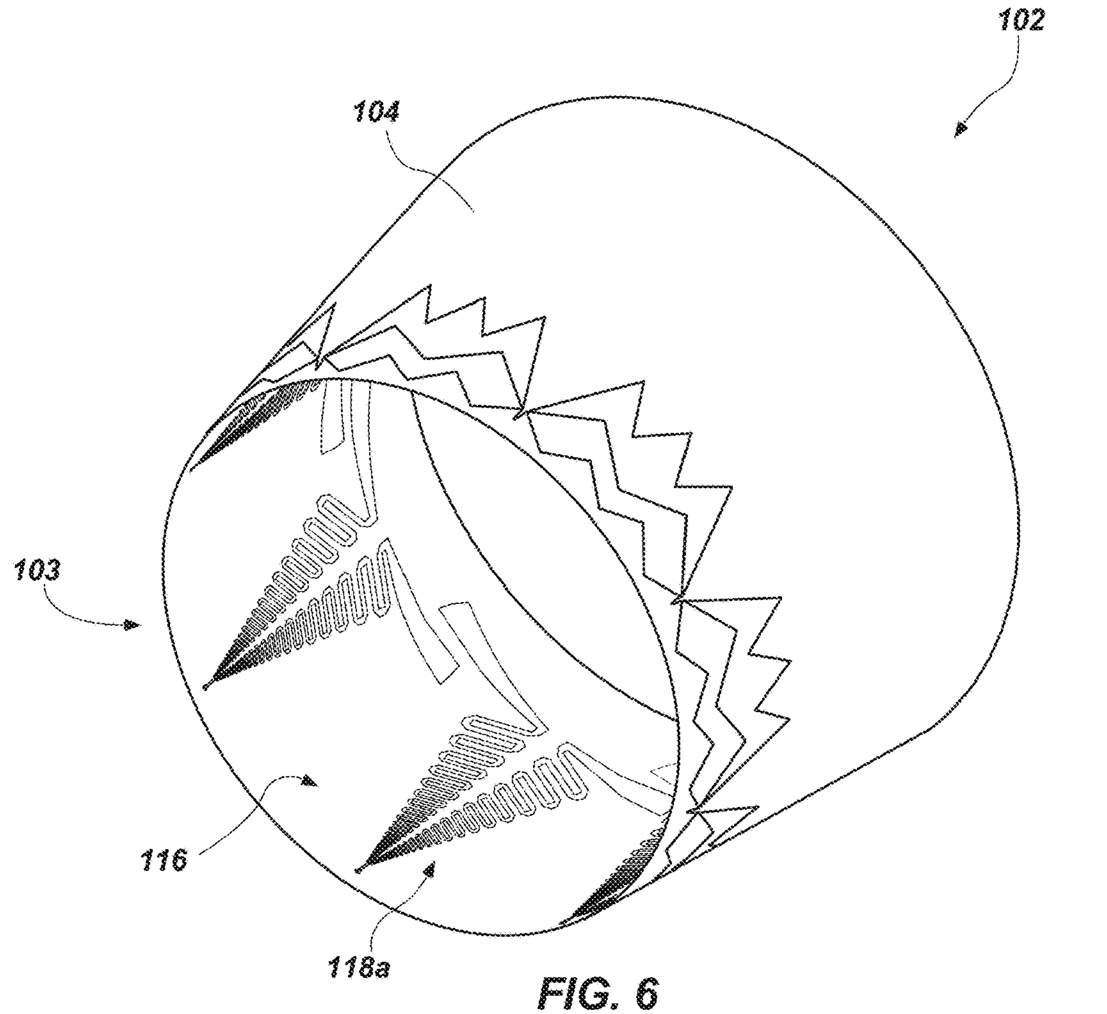
FIG. 6 is a perspective view of a fairing component of an antenna assembly according to one or more embodiments of the present disclosure.
Figure 7:
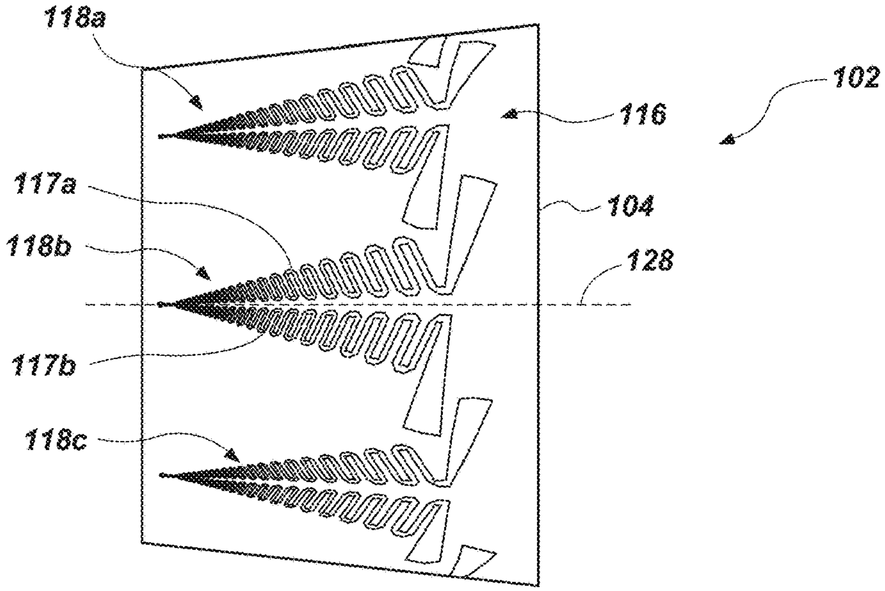
FIG. 7 is a side cross-sectional view of the fairing component of FIG. 6.
Figure 8A:
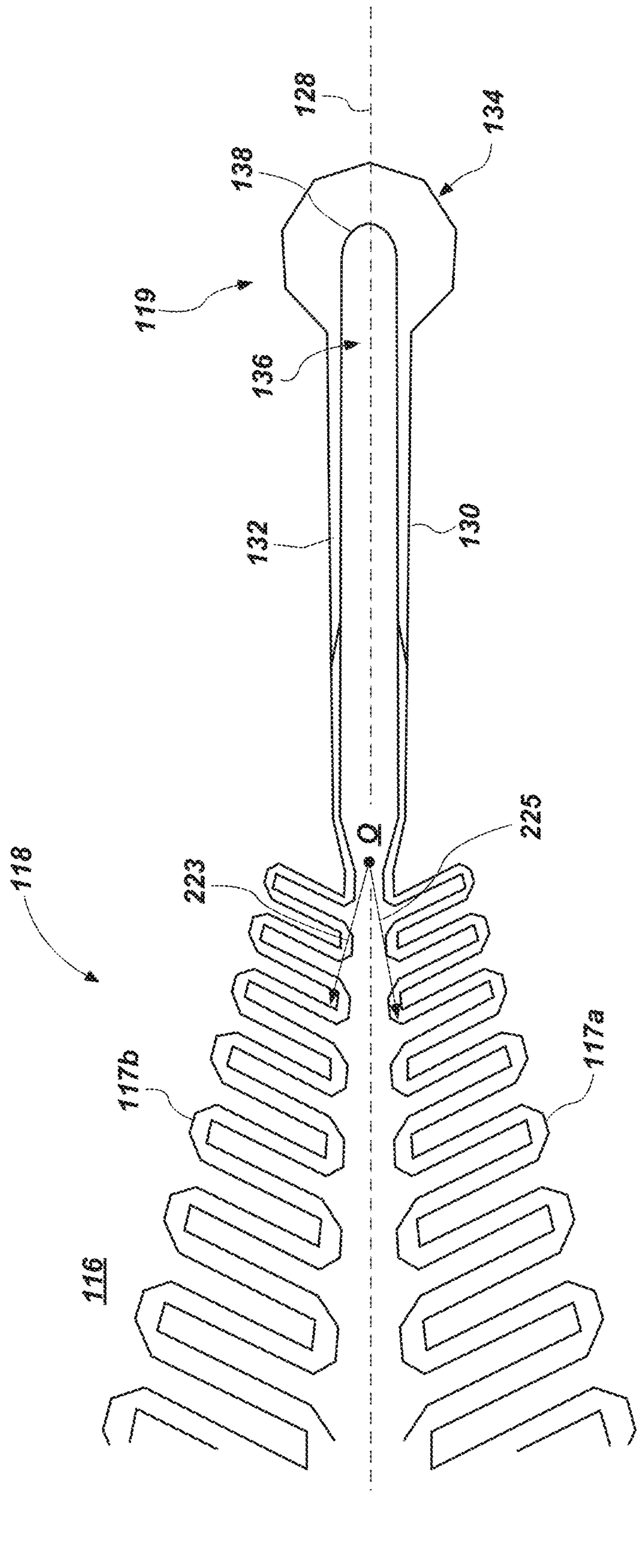
FIG. 8A is an enlarged view of a portion of an antenna element of a fairing component according to one or more embodiments of the present disclosure.
Figure 8B:
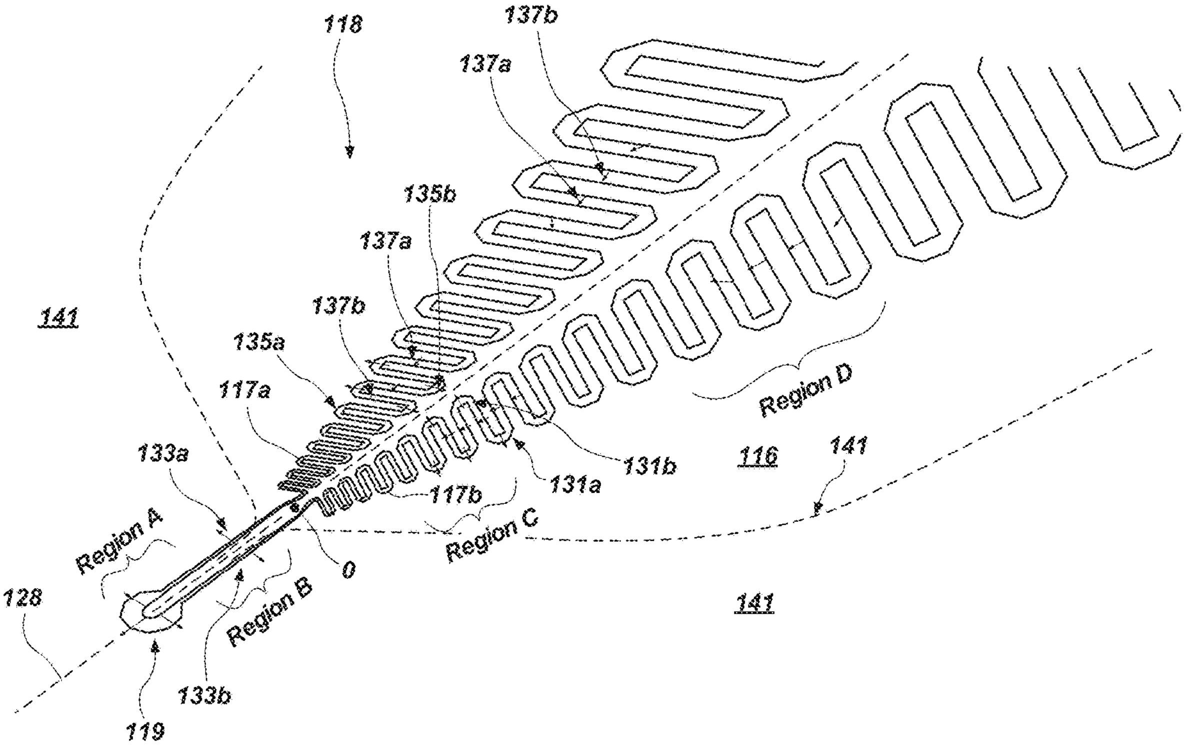
FIG. 8B is another enlarged view of a portion of an antenna element of the fairing component.
Figure 9:
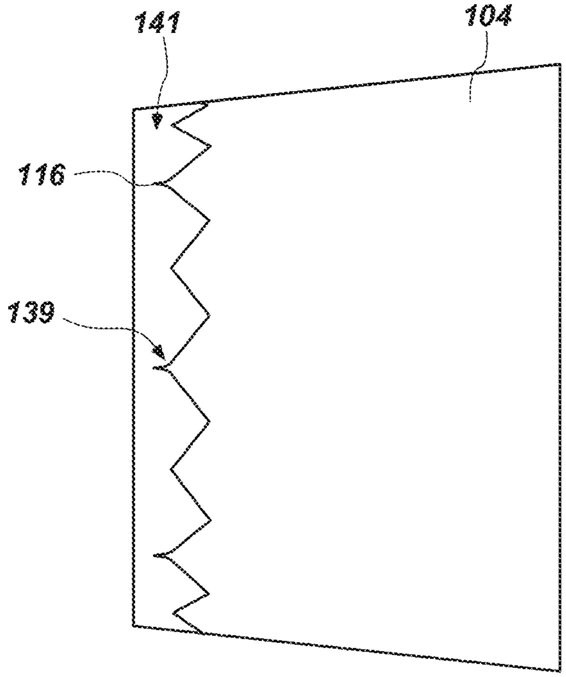
FIG. 9 is a side view of a fairing component with one or more elements removed to better show a coating of the fairing component.
Figure 10:
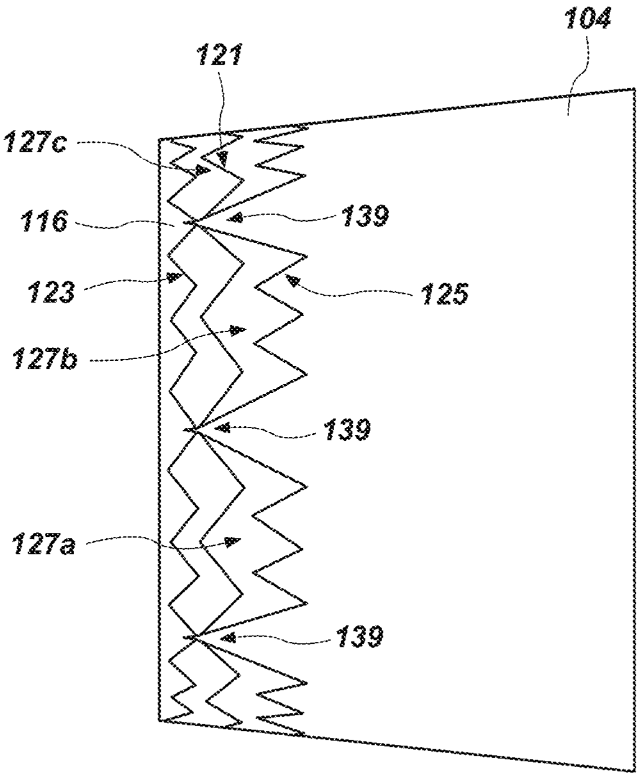
FIG. 10 is another side view of the fairing component showing a termination pattern of the fairing component.

FIG. 6 is a perspective view of the fairing component 104 according to one or more embodiments of the present disclosure. FIG. 7 is a side cross-sectional view of the fairing component 104. FIG. 8A is an enlarged view of a portion of an antenna element of the fairing component 104 according to one or more embodiments of the present disclosure. FIG. 8B is another enlarged view of a portion of an antenna element of the fairing component 104. FIG. 9 is a side view of the fairing component 104 with one or more elements (e.g., a termination pattern) removed to better show a coating of the fairing component 104. FIG. 10 is another side view of the fairing component 104 showing a termination pattern of the fairing component 104.

Referring to FIGS. 6-10 together, in one or more embodiments, the fairing component 104 may have a coating 116 (e.g., a conductive coating) formed on an inner surface of the fairing component 104. Additionally, the fairing component 104 may include a plurality of antenna elements 118*a*, 118*b*, 118*c*, etc. (e.g., planar antenna elements, planar waveguides, semi-coplanar waveguides, planar antenna arrays, etc.), formed in the coating 116. Each of the antenna elements 118*a*, 118*b*, 118*c* may include two general sinusoidal slot lines 117*a*, 117*b* (e.g., absence of coating 116 lines) formed in the coating 116. In particular, the two general sinusoidal slot lines 117*a*, 117*b* are defined by an absence of the coating 116 on the inner surface of the fairing component 104 and expose the material of the fairing component 104. Each of the two general sinusoidal slot lines 117*a*, 117*b* may form a transmission line (i.e., a first transmission line and a second transmission line) of the respective antenna element (e.g., antenna element 118*a*). As is described in greater detail below, each of the antenna elements 118*a*, 118*b*, 118*c* may operate as a traveling wave type antenna.

In some embodiments, the fairing component 104 may form a dielectric body. For example, the fairing component 104 may include a ceramic matrix composite (CMC). For instance, in one or more embodiments, the fairing component 104 may include an aluminosilicate matrix (e.g., AS/N312, AS/N720, A/N720, AS/N650, AS/N610). In additional embodiments, the fairing component 104 may include any other type of CMC material suitable for aerospace applications, such as, for example C/C (e.g., carbon fibers reinforcing a carbon matrix), SiC/SiC, C/SiC and/or Oxide/Oxide CMC materials. In some embodiments, the fairing component 104 may have a thickness within a range of about 0.025 inch and about 0.075 inch. For example, the fairing component 104 may have a thickness of about 0.055 inch. Furthermore, while a specific thickness of the fairing component 104 is provided as an example herein, the present disclosure is not so limited, and the fairing component 104 may have any thickness facilitating an application of the fairing component 104 to achieve desired structural and/or electrical properties. For instance, the fairing component

104 may have a thickness greater than 0.075 inch, 0.10 inch, 0.20 inch, 0.5 inch, 1.0 inch, 5.0 inches, 10.0 inches, or any other thickness.

In one or more embodiments, the coating 116 may include a gold coating (e.g., a gold cermet). In other embodiments, the coating 116 may include silver, copper, annealed copper, aluminum, calcium, tungsten, zinc, nickel, iron, titanium, or any alloy thereof. In some embodiments, the coating 116 may be applied to the fairing component 104. For example, the coating 116 may be printed onto the fairing component 104. In some embodiments, the coating 116 may include a silk screen that is sprayed or printed onto the fairing component 104. Furthermore, the coating 116 may be patterned via etching or patterning within a silk-screening process. The coating 116 may cover at least substantially an entirety of an inner surface of the fairing component 104, and the coating 116 may wrap around the narrow end 103 of the fairing component 104 and across a portion of the outer surface of the fairing component 104. As is described in greater detail below, the portion of the coating 116 that wraps around the fairing component 104 and across a portion of the outer surface of the fairing component 104 may provide a conductive shield near a launch portion of the antenna elements 118*a*, 118*b*, 118*c*.

In some embodiments, the coating 116 may have a thickness within a range of about 0.0004 inch and about 0.0014 inch. For example, the coating 116 may have a thickness of about 0.0005 inch. Furthermore, while a specific thickness of the coating 116 is provided as an example herein, the present disclosure is not so limited, and the coating 116 may have any thickness facilitating an application of the coating 116. For instance, the fairing component 104 may have a thickness of greater than 0.0014 inch, 0.002 inch, 0.003 inch, 0.005 inch, 0.01 inch, or any other thickness. Moreover, in one or more embodiments, the coating 116 may have a thickness that maintains a bulk conductivity of <mΩ/unit area.

Referring still to FIGS. 6-10, the two general sinusoidal slot lines 117*a*, 117*b* of each antenna element 118*a*, 118*b*, 118*c* may be formed via laser etching processes. For example, the laser etching process may include an automated galvanometer driven laser etching process. In other embodiments, the coating 116 may be formed on the fairing component 104 via a silk-screening process such that the two general sinusoidal slot lines 117*a*, 117*b* of each antenna element 118*a*, 118*b*, 118*c* are predefined and formed during the silk-screening process. On other words, after forming the coating 116 of the fairing component 104, there is no need to remove material to define the two general sinusoidal slot lines 117*a*, 117*b*. For example, a pattern of the coating 116 utilized to silk screen may define the two general sinusoidal slot lines 117*a*, 117*b*. To facilitate description of the antenna elements 118*a*, 118*b*, 118*c*, a single antenna element may be referred to as an “antenna element 118,” and the description of the single antenna element 118 applies to each of the antenna elements 118*a*, 118*b*, 118*c* of the antenna assembly 102.

As noted above, the antenna element 118 may include a first general sinusoidal slot line 117*a* (referred to hereinafter as “first slot line 117*a*”) and a second general sinusoidal slot line 117*b* (referred to hereinafter as “second slot line 117*b*”), which effectively form the two elements of the antenna element 118. As is described herein, the antenna element 118 may form a duality (i.e., contrast) of a conventional wireline log-periodic antenna and may operate as a traveling wave type antenna.

Referring particularly to FIGS. 7-8B, the antenna element 118 may be driven by a coaxial cable of a cable assembly 114 transmitting a driving frequency and coupled to a launch portion 119 of the antenna element 118. As a result, the first and second slot lines 117*a*, 117*b* may operate as transmission lines in a manner similar to slot antennas. For example, voltages may be created across the first and second slot lines 117*a*, 117*b* and as a result, magnetic fields may be created across the first and second slot lines 117*a*, 117*b*.

The portion of the coating 116 formed on the outer surface of the fairing component 104 and depicted in FIG. 8B with the dotted line forms a conductive shield 141 at (e.g., proximate) the launch portion 119 and isolates and suppresses higher order modes at the launch portion 119 (Region A) from radiating prior to initiating a desired (e.g., selected) co-planar propagating mode (Region B) along the first and second slot lines 117*a*, 117*b*. The conductive shield 141 of the coating 116 on the outer surface of the fairing component 104 is separated from the launch portion 119 by material of the fairing component 104 (e.g., a high-dielectric constant substrate (e.g., aluminosilicate matrix)). Additionally, the conductive shield 141 is transitioned away from a remainder of the antenna element 118, which results in the material of the fairing component 104 (e.g., a high dielectric constant substrate) being on the exterior of the remainder of the antenna element 118.

The first and second slot lines 117*a*, 117*b* may be mirrored about an antenna center axis 128 extending through a reference origin, O. Having the first and second slot lines 117*a*, 117*b* be mirrored about the antenna center axis 128 may effectively cancel the magnetic fields across the first and second slot lines 117*a*, 117*b* in the far field (e.g., the magnetic fields that are in a mirror direction (Region C; arrows 131*a*, 131*b*)). As a result, for a given slot line (e.g., first slot line 117*a*), portions of the given slot line that extend in direction parallel to each other propagate as a transmission line and do not radiate (Region B; arrows 133*a*, 133*b*, and Region C; arrows 135*a*, 135*b*). Additionally, within Region C, a phase length around the first and second slot lines 117*a*, 117*b* is not long enough to create a delay around the cycle, and as a result, each cycle cancels in the far field.

Additionally, the antenna element 118 may be frequency independent due to its geometric shape defined by angles and self-scaling. Furthermore, within Region D of the antenna element 118, the antenna element 118 may radiate and a phase of the instantaneous electric field along the first and second slot lines 117*a*, 117*b* in relationship to adjoining sections may be aligned in a transverse direction to the antenna center axis 128, and the electric fields may add in phase in the direction of the propagation plane, as is represented by arrows 137*a*, 137*b* being in line. The foregoing occurs where a propagation length around sections of the first and second slot lines 117*a*, 117*b* including a first linear portion, an adjacent linear portion, and an arcuate portion extending between the linear portion and the adjacent linear portion, (referred to hereinafter as a “bobby pin portion”) approximate a half wavelength. Additionally, within the observation plane, the phase of the frequencies is where the fields add together. This is achieved due to the reversal of directions within the bobby pin portions and when the propagation delay matches a necessary phase such that all fields in an active direction add in phase.

Referring still to FIGS. 7-8B, the transmission line propagation velocities exhibited by the first and second slot lines 117*a*, 117*b* are substantially different to free space propagation velocities exhibited by classical log-periodic antennas. Therefore, change of pitch (e.g., frequency of the sinusoidal shape) rates and expansion (e.g., amplitude changing) rates of the first and second slot lines 117*a*, 117*b* are selected to achieve desired element directivity and gain flatness across an operating band of the antenna element 118. In some embodiments, the change of pitch rates and the expansion rates are at least partially dependent on the dielectric constant of the material of the fairing component 104. For instance, as a dielectric constant of the material of the fairing component 104 increases, an expansion rate of the first and second slot lines 117*a*, 117*b* decreases to achieve desired element directivity and gain flatness across an operating band of the antenna element 118. In some embodiments, in a direction (depicted as arrows 223, 225) extending from the origin point O, the amplitudes of the first and second slot lines 117*a*, 117*b* increase at the expansion rate, and the frequency decreases at the change of pitch rate. Moreover, the change of pitch rates and the expansion rates are at least partially dependent on a thickness of the material of the fairing component 104. In some embodiments, a respective width of the first and second slot lines 117*a*, 117*b* increases along the length of the first and second slot lines 117*a*, 117*b*. In other embodiments, a respective width of the first and second slot lines 117*a*, 117*b* may remain substantially constant along the length of the first and second slot lines 117*a*, 117*b*.

In some embodiments, each of the antenna elements 118*a*, 118*b*, 118*c* may be forward facing (i.e., forward looking). In additional embodiments, the aerial vehicle 100 may include both forward facing and aft facing antenna elements. For instance, the aerial vehicle 100 may include pairs of antenna elements similar to those described in U.S. Pat. No. 7,583,233, the Goldberg et al., issued Sep. 1, 2009, the disclosure of which is incorporated in its entirety by reference herein.

Referring specifically to FIGS. 8A and 8B, near the origin point O (the point from which the first and second slot lines 117*a*, 117*b* extend and expand, and the point near which the first and second slot lines 117*a*, 117*b* approximate each other) the first and second slot lines 117*a*, 117*b* of the antenna element 118 may transition from the oscillating general sinusoidal shape to two parallel linear lines 130, 132 extending from the general sinusoidal shape and meeting at a general circular slot portion 134. The two parallel lines 130, 132 may define a connector contact region 136 there between. In some embodiments, the connector contact region 136 may have an elongated rectangle shape (e.g., between the two parallel linear lines 130, 132) with a rounded end defined within the circular slot portion 134. The connector contact region 136 may extend past a center of the general circular slot portion 134 of the first and second slot lines 117*a*, 117*b*, and a tip 138 (i.e., the rounded end) (e.g., a "feed point") of the connector contact region 136 may be isolated from a remainder of the coating 116 by the general circular slot portion 134 (i.e., the etched circular slot portion 134). As is described in further detail below, a portion of the cable assembly 114 may be sized and shaped to contact the connector contact region 136 of the antenna element 118. Moreover, the connector contact region 136, the two parallel linear lines 130, 132 of the first and second slot lines 117*a*, 117*b*, the circular slot portion 134 of the first and second slot lines 117*a*, 117*b*, and a region immediately surrounding the circular slot portion 134 of the first and second slot lines 117*a*, 117*b* may define a launch portion 119 of the antenna element 118. In some embodiments, each of the first and second slot lines 117*a*, 117*b* may terminate in an elongated triangle slot portion (e.g., a fat dipole). In other embodiments, the first and second slot lines 117*a*, 117*b* may be connected together at ends opposite the origin point O.

Referring specifically to FIGS. 9 and 10, the coating 116 on the outer surface of the fairing component 104 may terminate in a general triangular-wave form shape. In other words, the boundary of the coating 116 on the outer surface of the fairing component 104 may define a general triangular-wave form shape. Additionally, as is referenced above, where the plurality of cable assemblies 114 are coupled to inner surface of the fairing component 104 (i.e., proximate the launch portions 119 of the antenna elements 118*a*, 118*b*, 118*c*), the coating 116 on the outer surface may define (e.g., include) elongated triangle-shaped notches 139 formed in valleys of the triangular-wave form of the coating 116. The triangle-shaped notches 139 may be aligned with the connector contact regions 136 of the antenna elements 118*a*, 118*b*, 118*c*, and the triangle-shaped notches 139 may point toward the center of the general circular slot portion 134 of the first and second slot lines 117*a*, 117*b*. The triangle-shaped notches 139 may provide tapered ground transitions. The combination of the general circular slot portion 134 of the first and second slot lines 117*a*, 117*b*, the first and second slot lines, and the triangle-shaped notches 139 may also provide a transition from a micro-strip co-planar waveguide to a slot. Conventional micro-strip log-periodic antenna pattern structures tend to lose functional integrity (e.g., fall apart) around X-Band. The triangle-shaped notches 139 of the present disclosure enable the antenna element 118 to maintain functional integrity at at least 40 GHz.

Referring still to FIGS. 6-10, in some embodiments, the antenna element 118 may include a single slot line that is an asymmetric log-periodic structure in place of the first and second slot lines 117*a*, 117*b*.

Additionally, the fairing component 104 may include a termination pattern 121 formed over and overlaying a portion of the boundary of the coating 116. Additionally, the termination pattern 121 may have a first boundary 123 defined over the coating 116 and a second, opposite boundary 125 formed over the fairing component 104 beyond the coating 116. In other words, the termination pattern 121 may span the boundary of the coating 116. In some embodiments, the termination pattern 121 may include a plurality of segments 127*a*, 127*b*, 127*c*, etc., in series and oriented around a circumference of the fairing component 104. Each segment 127 of the termination pattern 121 may overlay portions of the coating 116 between adjacent triangle-shaped notches 139 of coating 116. Additionally, the termination pattern 121 may not be formed over the triangle-shaped notches 139 of coating 116. Each segment 127 of the termination pattern 121 may have a first boundary 123 formed over the coating 116, and a second, opposite boundary 125 formed over the surface of the fairing component 104.

In some embodiments, the termination pattern 121 may include a resistive metallic material that can yield a desired ohms/square inch of resistivity. For example, the termination pattern 121 may include an R-Card material. Furthermore, the termination pattern 121 may provide a field termination that performs pattern control for the antenna elements 118*a*, 118*b*, 118*c*. Moreover, the termination pattern 121 may help to prevent bifurcation of transmission signals.

Referring still to FIGS. 6-10, each of the antenna elements 118*a*, 118*b*, 118*c* may include a directional antenna. Additionally, as noted above, the antenna elements 118*a*, 118*b*, 118*c* may operate across a wide bandwidth. For instance, in one or more embodiments, the antenna elements 118*a*, 118*b*, 118*c* may operate at frequencies ranging from 10 MHz to at least 40 GHz. Additionally, as mentioned briefly above, the antenna elements 118*a*, 118*b*, 118*c* may be utilized to receive radio frequencies and may communicate received RF signals via the cable assemblies 114 to a control system of the aerial vehicle 100. Moreover, in some embodiments, antenna elements 118*a*, 118*b*, 118*c* may be utilized to transmit communications from the control system to external or remote systems by emitting radio frequencies.

Figure 11A:
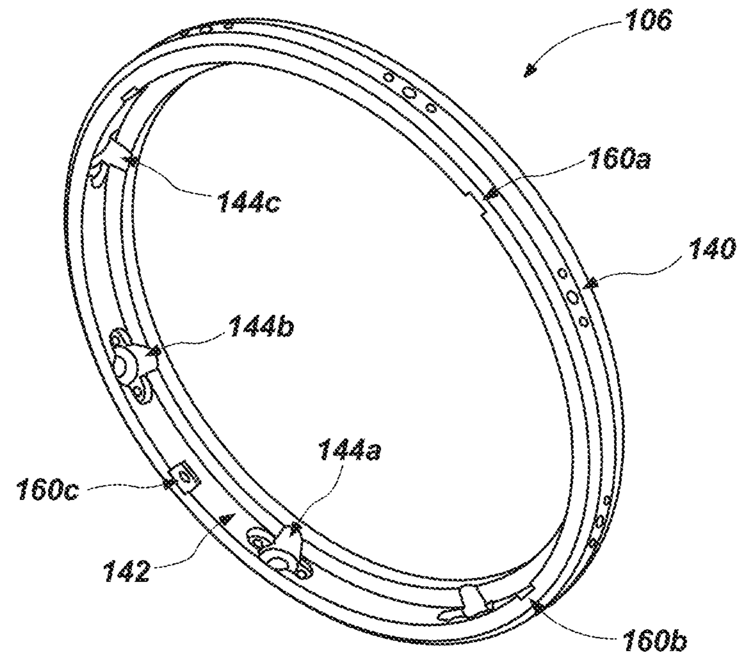
FIG. 11A is a perspective view of a connection ring of the antenna assembly according to one or more embodiments of the present disclosure.
Figure 11B:
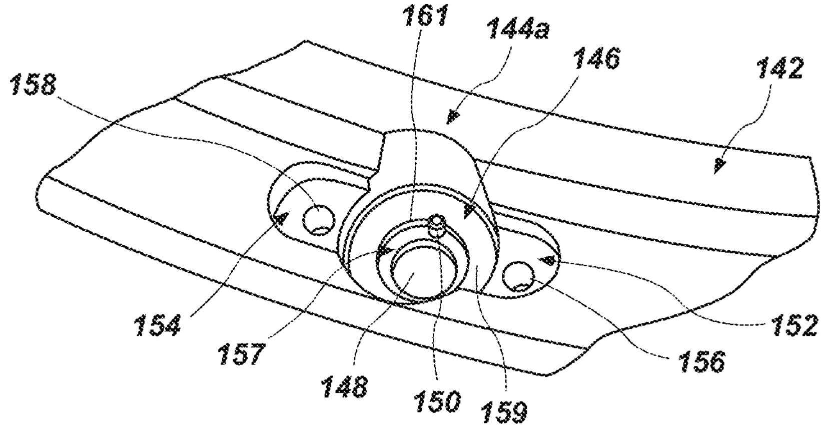
FIG. 11B is an enlarged partial perspective view of a cable assembly receiving structure of a connection ring according to one or more embodiments of the present disclosure.
Figure 11C:
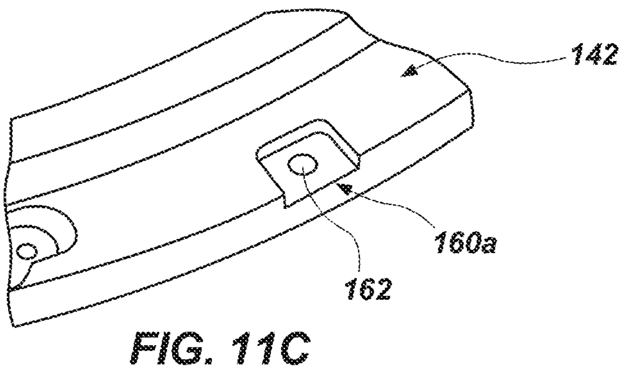
FIG. 11C is an enlarged partial perspective view of a tab receiving structure of a connection ring according to one or more embodiments of the present disclosure.

FIG. 11A is a perspective view of the connection ring 106 according to one or more embodiments of the present disclosure. FIG. 11B is an enlarged partial perspective view of a cable assembly receiving structure of the connection ring 106 according to one or more embodiments of the present disclosure. FIG. 11C is an enlarged partial perspective view of a tab receiving structure of the connection ring 106 according to one or more embodiments of the present disclosure.

Referring to FIGS. 11A-11C together, the connection ring 106 may have a general annular shape. The connection ring 106 may have an outer surface 140 for contacting the inner surface of the fairing component 104 and an opposite inner surface 142. The connection ring 106 may further defined a plurality of cable assembly receiving structures 144*a*, 144*b*, 144*c*, etc. (referred to hereinafter as "receiving structures"), for receiving connector structures of the cable assemblies (described below). Each of the receiving structures 144*a*, 144*b*, 144*c* may include a stepped-circular recess 146, an aperture 148, an alignment pin 150, and opposing wing recesses 152, 154. The aperture 148 may extend completely through the connection ring 106 from a bottommost surface 157 of the stepped-circular recess 146. The alignment pin 150 may extend upward axially from the bottommost surface 157 of the stepped-circular recess 146 and may abut a sidewall 161 of a bottommost step 159 of the stepped-circular recess 146, and as is discussed in greater detail below, the alignment pin 150 may assist in properly aligning a respective cable assembly 114 when installing (e.g., fastening) a cable assembly 114 to the connection ring 106. The opposing wing recesses 152, 154 may be formed on opposing sides of the stepped-circular recess 146 and may be align along an annular axis of the connection ring 106. Furthermore, the opposing wing recesses 152, 154 may extend radially outward from the stepped-circular recess 146. Each of opposing wing recesses 152, 154 may include a respective fastener receiving aperture 156, 158, which may be threaded or otherwise sized and shaped to receive a fastener.

In one or more embodiments, the alignment pin 150 may be integrally formed with a portion of the connection ring 106 defining a respective receiving structure 144*a*. In other embodiments, the alignment pin 150 may be separate and discrete from the portion of the connection ring 106 defining a respective receiving structure 144*a*. For instance, the alignment pin 150 may have a respective recess into which the alignment pin 150 may be inserted and/or secured.

Referring still to FIGS. 11A-11C, the connection ring 106 may further define a plurality of tab receiving structures 160*a*, 160*b*, 160*c*, etc., for receiving tabs of the inner sleeve 112. In some embodiments, each of the tab receiving structures 160*a*, 160*b*, 160*c* may have a general rounded rectangular shape; however, the present disclosure is not so limited, and the tab receiving structures 160*a*, 160*b*, 160*c* may have any geometric shape correlating to shapes of tabs of the inner sleeve 112 (described below). Additionally, each of the tab receiving structures 160*a*, 160*b*, 160*c* may have a respective fastener receiving aperture 162, which may be threaded or otherwise sized and shaped to receive a fastener.

In some embodiments, the connection ring 106 may include a steel material. In one or more embodiments, the connection ring 106 may include stainless steel, brass, nickel, titanium, tungsten, or any alloy thereof. Furthermore, while specific examples of materials of the connection ring 106 are provided herein, the disclosure is not so limited, and the connection ring 106 may include any alloy that maintains structural integrity at the temperatures described herein and substantially meets the coefficient of thermal expansion of a material of the fairing component 104.

Figure 12A:
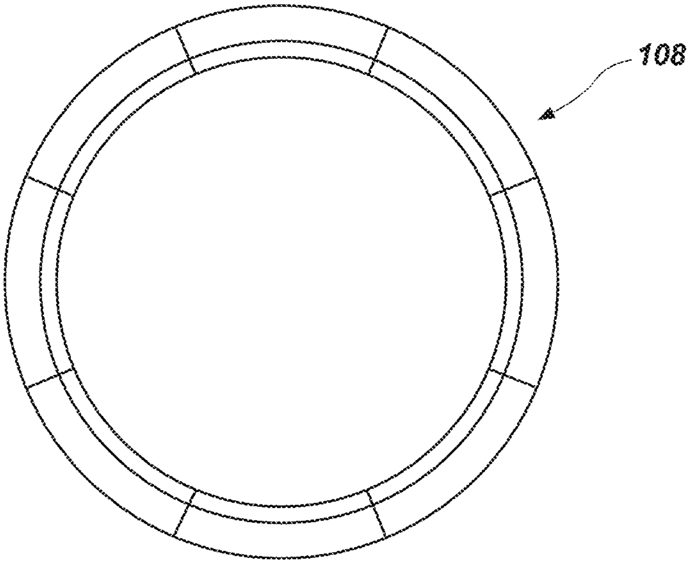
FIG. 12A is a front view of an insulator sleeve of an antenna assembly according to one or more embodiments of the present disclosure.
Figure 12B:
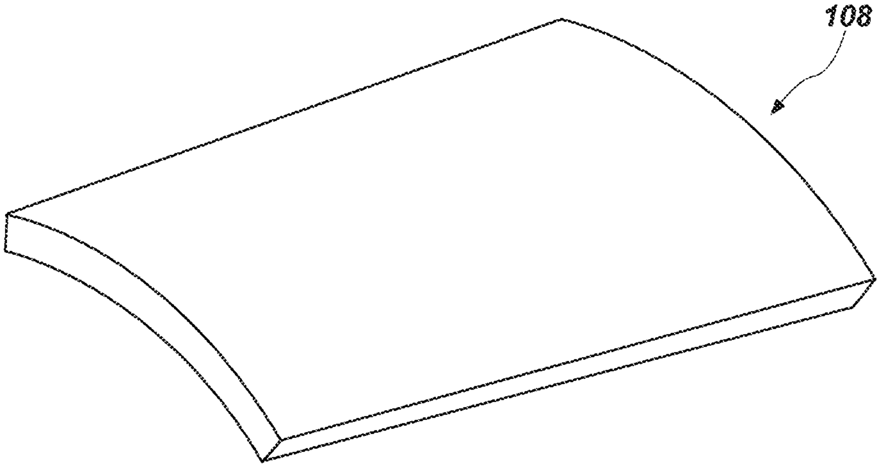
FIG. 12B is a perspective view of a portion of an insulator sleeve according to one or more embodiments of the present disclosure.

FIG. 12A is a front view of the insulator sleeve 108 according to one or more embodiments of the present disclosure. FIG. 12B is a perspective view of a portion of the insulator sleeve 108 according to one or more embodiments of the present disclosure. As mentioned above, in some embodiments, the insulator sleeve 108 may have a truncated ogive shape (or other shape to match the fairing component 104) and may have a shorter longitudinal length than the fairing component 104. As a result, the insulator sleeve 108 may be disposable within the fairing component 104, may abut against the connection ring 106, and may fit completely within the fairing component 104. Furthermore, a contour of an outer surface of the insulator sleeve 108 may at least substantially match a contour of the inner surface of the fairing component 104.

In some embodiments, the insulator sleeve 108 may include multiple pieces that, when assembled, form a sleeve. For instance, in some embodiments, the insulator sleeve 108 may include eight pieces where each piece forms a 450 portion of the sleeve. Additionally, seams between pieces of the insulator sleeve 108 may be oriented between antenna elements 118*a*, 118*b*, 118*c* of the fairing component 104. For example, each piece may be centered about an antenna element 118. In alternative embodiments, the insulator sleeve 108 may include a single piece sleeve, a two-piece sleeve, a four-piece sleeve, or any number of piece sleeve. In some embodiments, the insulator sleeve 108 may have a thickness within a range of about 0.25 inch and about 0.75 inch. For example, the insulator sleeve 108 may have a thickness of about 0.406 inch.

In one or more embodiments, the insulator sleeve 108 may include a dielectric foam. For example, in some embodiments, the insulator sleeve 108 may include a ceramic foam. As a non-limiting example, the insulator sleeve 108 may include AETB-12 ceramic tile insulation. In other embodiments, the insulator sleeve 108 may include one or more of toughened unipiece fibrous insulation tile, AIM-22 Tile, Fibrous Refractory Composite Insulation-12 Tile, or any other insulation layer. In some embodiments, the insulator sleeve 108 may include a low-density, rigid refractory structure composed of high-alpha polycrystalline alumina fibers and high-purity inorganic binders. For instance, the insulator sleeve 108 may include Alumina Type ZAL-12. While specific examples are provided herein, the insulator sleeve 108 may include any dielectric insulator (e.g., a low dielectric insulator). The insulator sleeve 108 may at least partially inhibit heat transfer from an exterior of the fairing component 104 to an interior of the antenna assembly 102 and the aerial vehicle 100.

Figure 13A:
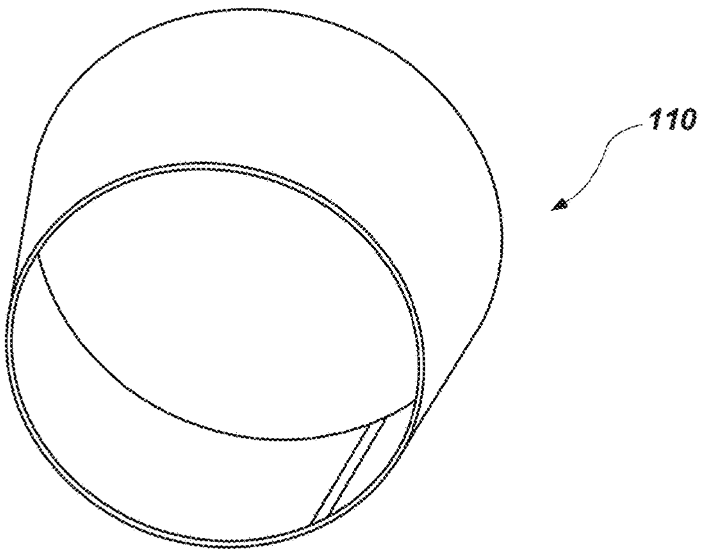
FIG. 13A is a perspective view of an absorber sleeve of an antenna assembly according to one or more embodiments of the present disclosure.
Figure 13B:
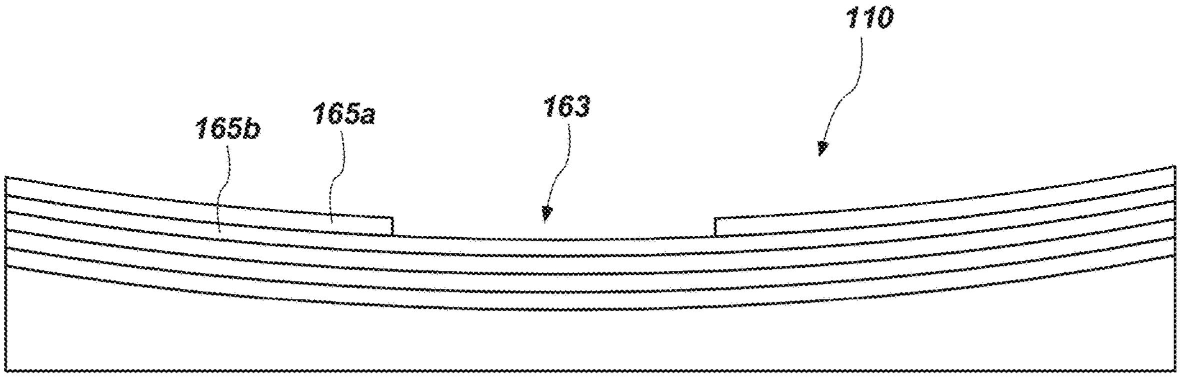
FIG. 13B is a side partial cross-sectional view of an absorber sleeve according to one or more embodiments of the present disclosure.

FIG. 13A is a perspective view of the absorber sleeve 110 according to one or more embodiments of the present disclosure. FIG. 13B is a side partial cross-sectional view of the absorber sleeve 110 according to one or more embodiments of the present disclosure.

Referring to FIGS. 13A and 13B together, in some embodiments, the absorber sleeve 110 may include a plurality of layers 165*a*, 165*b* of material. In some embodiments, the absorber sleeve 110 may include two layers with a first layer having a thickness forming about 60% (e.g., 60 mils) of an overall thickness of the absorber sleeve 110 and a second layer having a thickness forming about 40% (e.g., 40 mils) of the overall thickness of the absorber sleeve 110. In additional embodiments, the absorber sleeve 110 may include three, four, five, or more layers. Additionally, in some embodiments, an innermost layer of absorber sleeve 110 may include at least one slot 163 (i.e., cutout) to receive a protrusion (e.g., jog) of the inner sleeve 112 (described below).

In some embodiments, the absorber sleeve 110 may have an overall thickness within a range of about 75 mils and about 125 mils. For example, the absorber sleeve 110 may have a thickness of about 100 mils. Furthermore, while a specific thickness of the absorber sleeve 110 is provided as an example herein, the present disclosure is not so limited, and the absorber sleeve 110 may have any thickness facilitating an application of the absorber sleeve 110. For instance, the absorber sleeve 110 may have a thickness of greater than 100 mils, 200 mils, 0.5 inch, 1.0 inches, 5.0 inches, 10 inches, or any other thickness. In some embodiments, an overall thickness of the absorber sleeve may be at least partially dependent on the size and shape of the antenna element 118. For instance, the absorber sleeve 110 may match the antenna element 118 to (e.g., provide the antenna element 118 with) a limited size cavity without shorting the antenna element 118 to the ground of the cavity (e.g., the inner sleeve 112). For example, the absorber sleeve 110 may make the cavity larger from an electrical viewpoint. Furthermore, in one or more embodiments, each layer of the absorber sleeve 110 may include a plurality of pieces in a manner similar of the same as the insulator sleeve 108 and seams between adjacent pieces may lie between antenna elements of the plurality of antenna elements 118*a*, 118*b*, 118*c*.

In one or more embodiments, the absorber sleeve 110 may include a high impedance laminate. For example, the absorber sleeve 110 may include a low loss, high resistivity ceramic filler, and a high-temperature polytetrafluoroethylene matrix, Teflon matrix, and/or thermoplastic matrix. For instance, the absorber sleeve 110 may include a MAGTREX™ high impedance laminate. The absorber sleeve 110 may serve to absorb extraneous or undesired fields in the cavity (e.g., absorb unwanted standing waves) within a particular range of radio frequencies. In particular, the absorber sleeve 110 may mitigate a cavity mode that would produce an effective short circuit across an active region of the antenna element 118. In some embodiments, a cavity depth is one fourth wavelength making a reflected wave from the cavity at the antenna element 118 be in phase with a driving field. The limiting factor is that this condition cannot be achieved over multi-octave bandwidths requiring an absorber. Accordingly, the absorber sleeve 110 of the present disclosure provides an effectively high enough impedance at the antenna element 118 active region while not dissipating the energy in the transmission line (e.g., first and second slot lines 117*a*, 117*b*) and is capable of handling the relatively high temperatures described herein. Additionally, the absorber sleeve 110 may also at least partially inhibit heat transfer from an exterior of the fairing component 104 to an interior of the antenna assembly 102 and the aerial vehicle 100. As is known in the art, an antenna assembly having an absorber sleeve comprising a high impedance laminate may enable an antenna element to have a smaller size by absorbing particular radio frequencies in comparison to antenna assembly not include such an absorber sleeve.

Figure 13C:
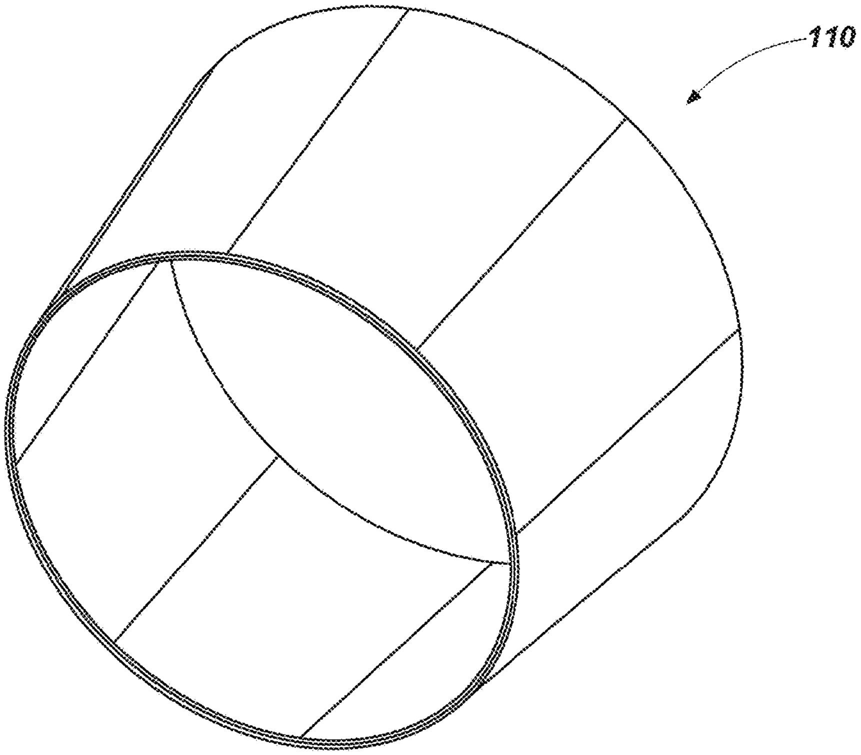
FIG. 13C is a perspective view of an absorber sleeve of an antenna assembly according to one or more embodiments of the present disclosure.
Figure 13D:
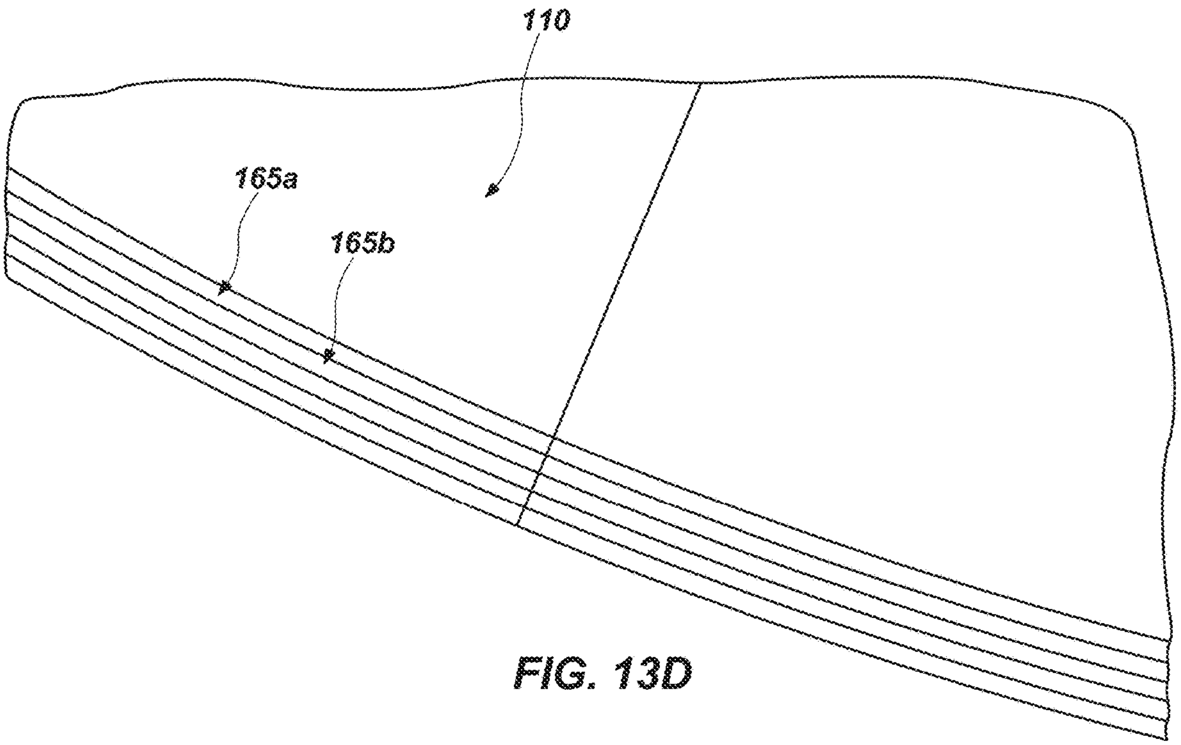
FIG. 13D is a side partial cross-sectional view of an absorber sleeve according to one or more embodiments of the present disclosure.

FIG. 13C is a perspective view of the absorber sleeve 110 according to one or more additional embodiments of the present disclosure. FIG. 13D is a side partial cross-sectional view of the absorber sleeve 110 according to one or more embodiments of the present disclosure.

In some embodiments, the absorber sleeve 110 may include multiple pieces that, when assembled, form a sleeve. For instance, in some embodiments, the absorber sleeve 110 may include eight pieces where each piece forms a 450 portion of the sleeve. Additionally, seams between pieces of the absorber sleeve 110 may be oriented between antenna elements 118*a*, 118*b*, 118*c* of the fairing component 104. For example, each piece may be centered about an antenna element 118. In alternative embodiments, the absorber sleeve 110 may include a two-piece sleeve, a four-piece sleeve, or any number of piece sleeve.

Additionally, in one or more embodiments, an innermost layer of absorber sleeve 110 may not include the at least one slot 163 described above. Rather, the innermost layer of the absorber sleeve 110 may be at least substantially continuous.

Figure 14A:
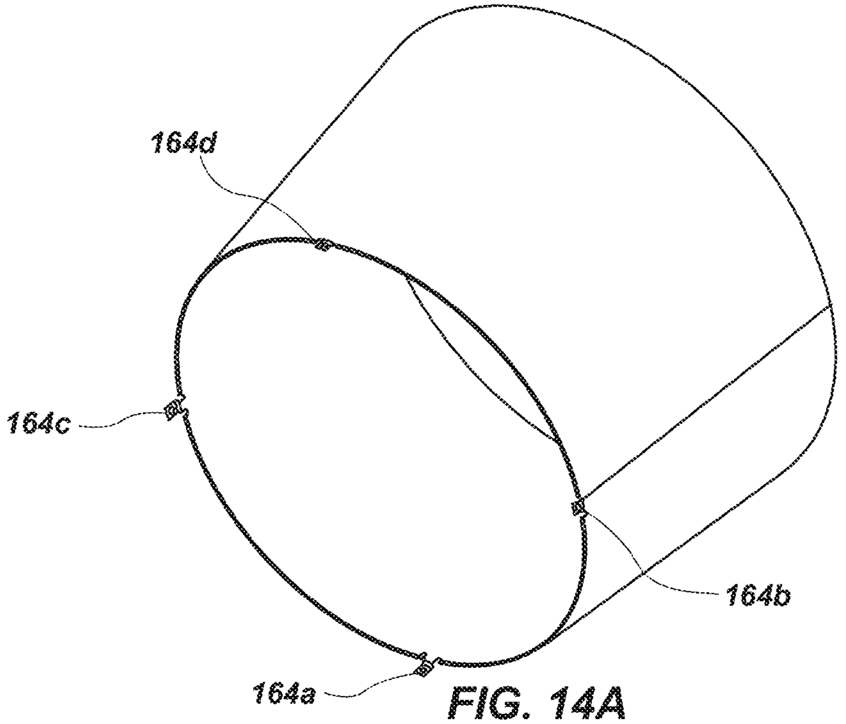
FIG. 14A is a perspective view of an inner sleeve of an antenna assembly according to one or more embodiments of the present disclosure.
Figure 14B:
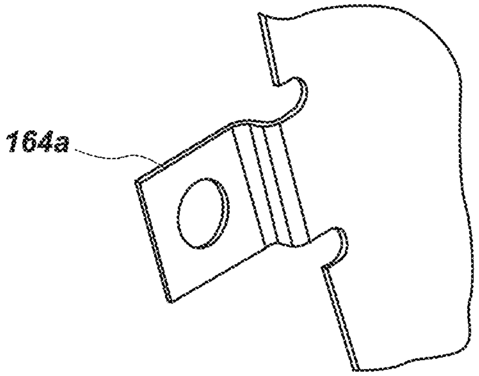
FIG. 14B is a partial perspective view of a tab of an inner sleeve for connecting to a connection ring according to one or more embodiments of the present disclosure.
Figure 14C:
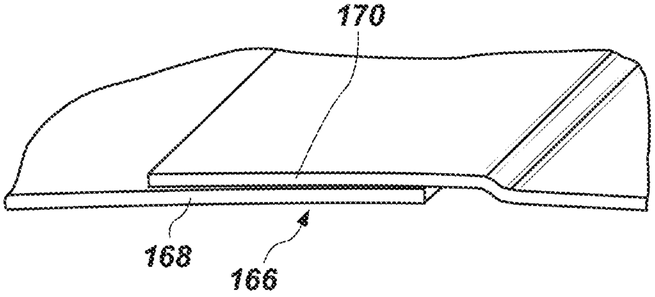
FIG. 14C is a partial perspective view of a jog of an inner sleeve for aligning the inner sleeve with a connection ring.

FIG. 14A is a perspective view of the inner sleeve 112 according to one or more embodiments of the present disclosure. FIG. 14B is a partial perspective view of a tab of the inner sleeve 112 for connecting to the connection ring 106 according to one or more embodiments of the present disclosure. FIG. 14C is a partial perspective view of the jog of the inner sleeve 112 for aligning the inner sleeve 112 with the connection ring 106.

Referring to FIGS. 14A-14C together, the inner sleeve 112 may include a plurality of tabs 164*a*, 164*b*, 164*c*, 164*d* extending generally axially from the inner sleeve 112 and at least one jog 166 formed in the inner sleeve 112. In some embodiments, the plurality of tabs 164*a*, 164*b*, 164*c*, 164*d* may be oriented to align with the plurality of tab receiving structures 160*a*, 160*b*, 160*c* of the connection ring 106 (FIGS. 11A-11C). Additionally, the plurality of tabs 164*a*, 164*b*, 164*c*, 164*d* may be sized and shaped to be received into the plurality of tab receiving structures 160*a*, 160*b*, 160*c* of the connection ring 106 (FIGS. 11A-11C) and to be fastened to the connection ring 106 via one or more fasteners.

In some embodiments, the at least one jog 166 of the inner sleeve 112 may include a portion of the inner sleeve 112 where a wall of the inner sleeve 112 overlaps with itself, and a portion of the overlap protrudes (e.g., projects) radially inward to a center longitudinal axis of the inner sleeve 112. In particular, the at least one jog 166 may include discontinuity 167 in the material of the inner sleeve 112 and two overlapping portions 168, 170 of the wall of the inner sleeve 112. In some embodiments, the two overlapping portions 168, 170 may not be connected. In other words, within the limits of the flexibility of a material of the inner sleeve 112, the two overlapping portions 168, 170 may be free to move relative to one another. According, the inner sleeve 112 is compressible by increasing an amount of overlap between the two overlapping portions 168, 170, and as a result, the outer diameter of the inner sleeve 112 may be reduced when inserting the inner sleeve 112 into the absorber sleeve 110. For example, the at least one jog 166 of the inner sleeve 112 may impart a spring function to the inner sleeve 112. Additionally, the at least one jog 166 may be sized and shaped to be aligned with the cutout of the absorber sleeve 110.

In some embodiments, the inner sleeve 112 may provide a controlled depth ground surface. The inner sleeve 112 may also provide structural support to the antenna assembly 102 and may hold the insulator sleeve 108 (FIG. 12A) and the absorber sleeve 110 in place relative the fairing component 104. In some embodiments, the inner sleeve 112 may include a metallic material. For instance, the inner sleeve 112 may include a stainless steel, a spring steel, titanium, etc. In some embodiments, the inner sleeve 112 may have a thickness within a range of about 0.005 inch and about 0.020 inch. For example, the inner sleeve 112 may have a thickness of about 0.011 inch. Furthermore, while a specific thickness of the inner sleeve 112 is provided as an example herein, the present disclosure is not so limited, and the inner sleeve 112 may have any thickness facilitating an application of the inner sleeve 112. For instance, the inner sleeve 112 may have a thickness of greater than 0.011 inch, 0.02 inch, 0.05, 0.10 inch, 0.5 inch, 1.0 inch, 5.0 inches, or any other thickness. For example, the inner sleeve 112 may have any thickness meeting mechanical requirements of the antenna assembly 102.

Figure 15A:
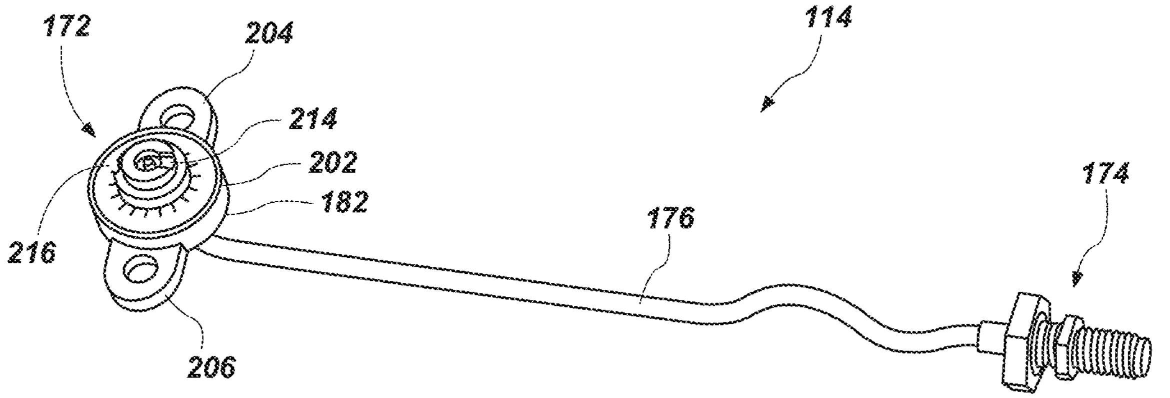
FIG. 15A is a perspective view of a cable assembly of an antenna assembly according to one or more embodiments of the present disclosure.
Figure 15B:
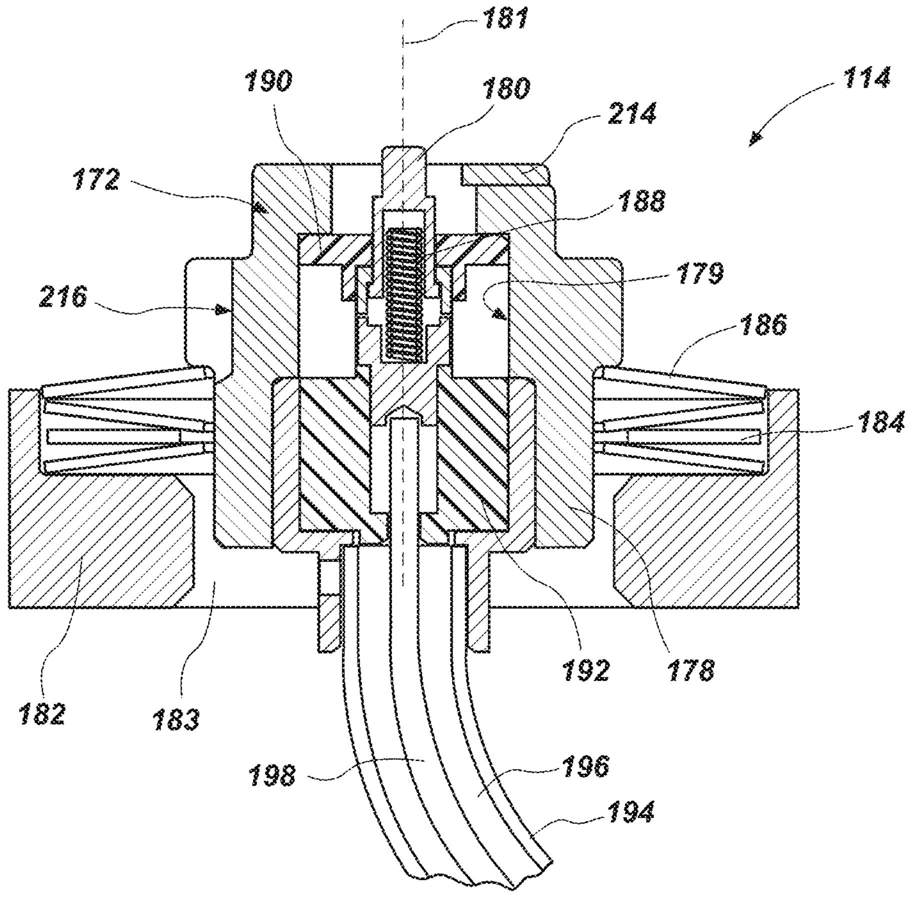
FIG. 15B is an enlarged, partial cross-sectional view of the cable assembly of FIG. 15A.
Figure 15C:
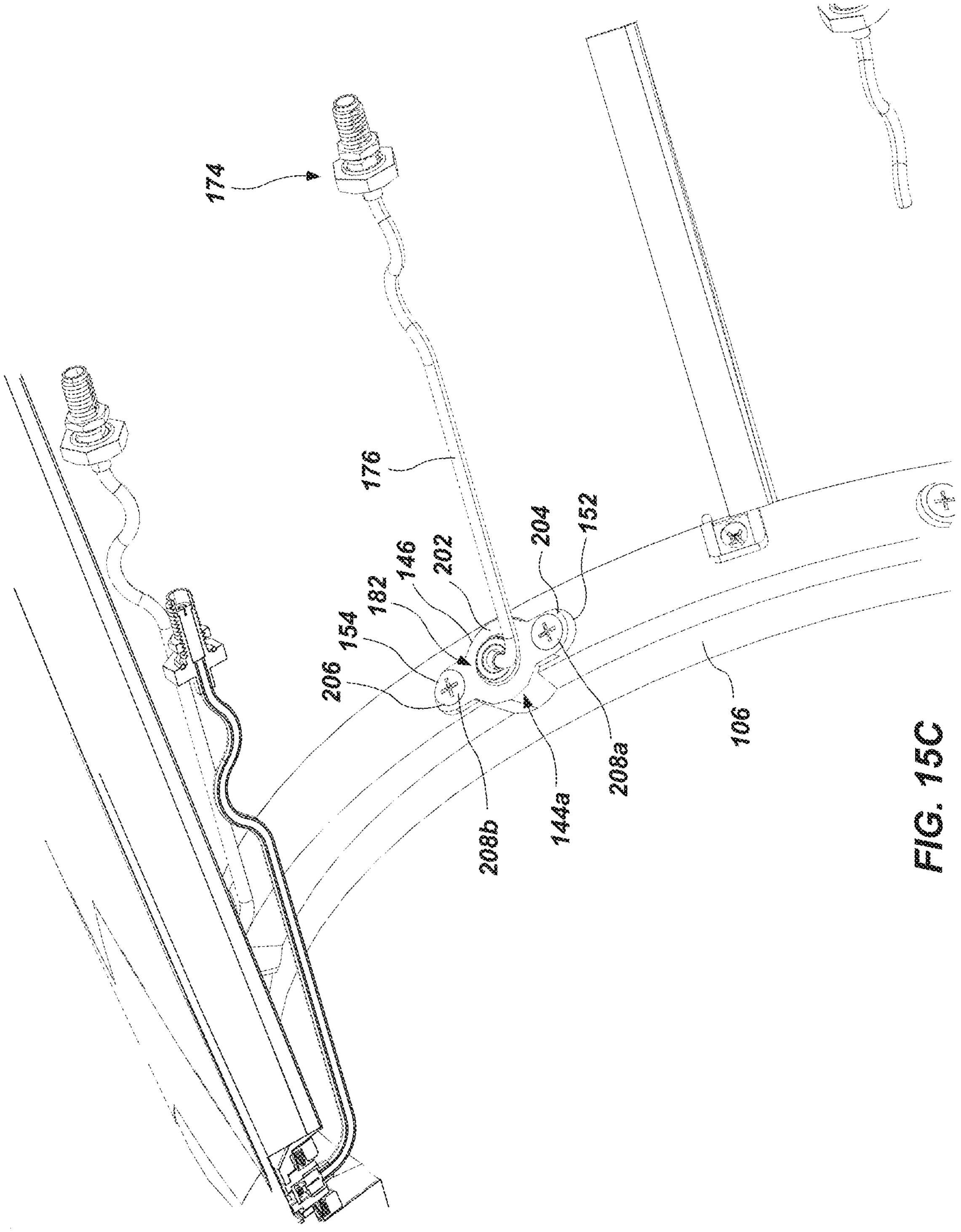
FIG. 15C is a cross-sectional view of a cable assembly mounted to a connection ring according to one or more embodiments of the present disclosure.
Figure 15D:
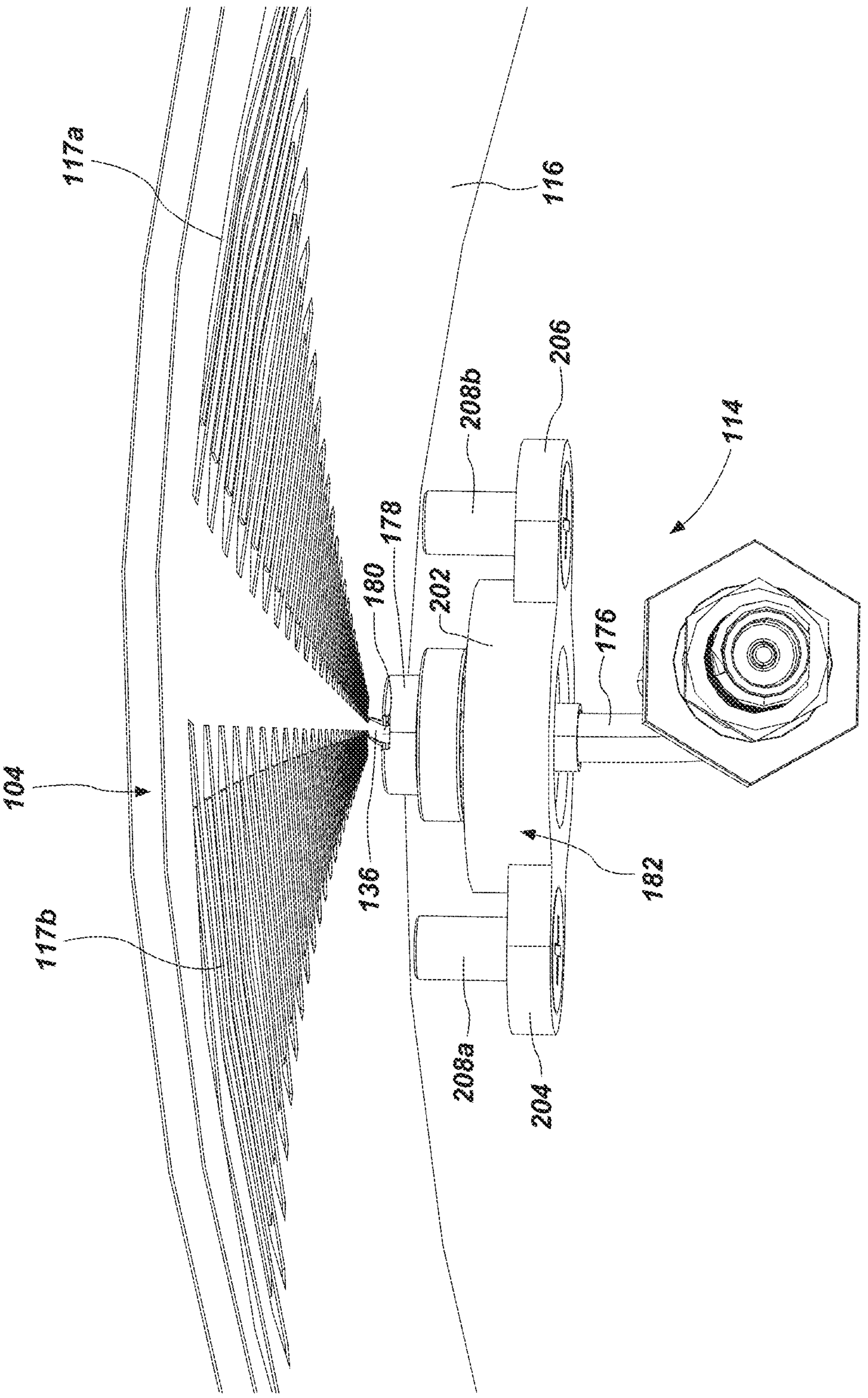
FIG. 15D is a perspective view of a cable assembly operably coupled to an antenna element according to one or more embodiments of the present disclosure.
Figure 15E:
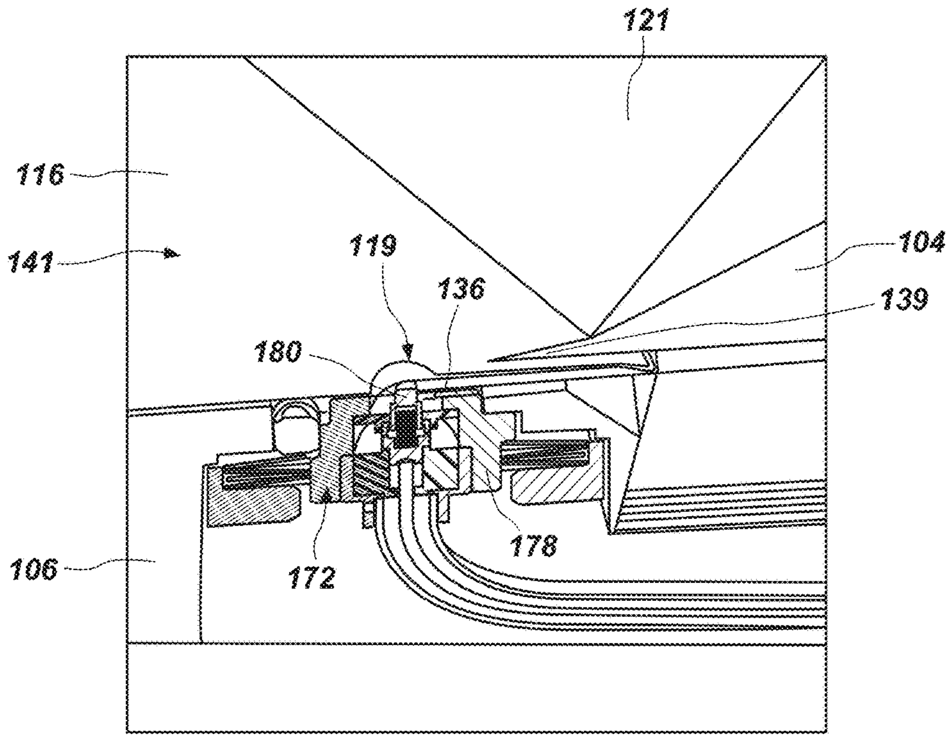
FIG. 15E is another cross-sectional view of the cable assembly mounted to the connection ring.
Figure 15F:
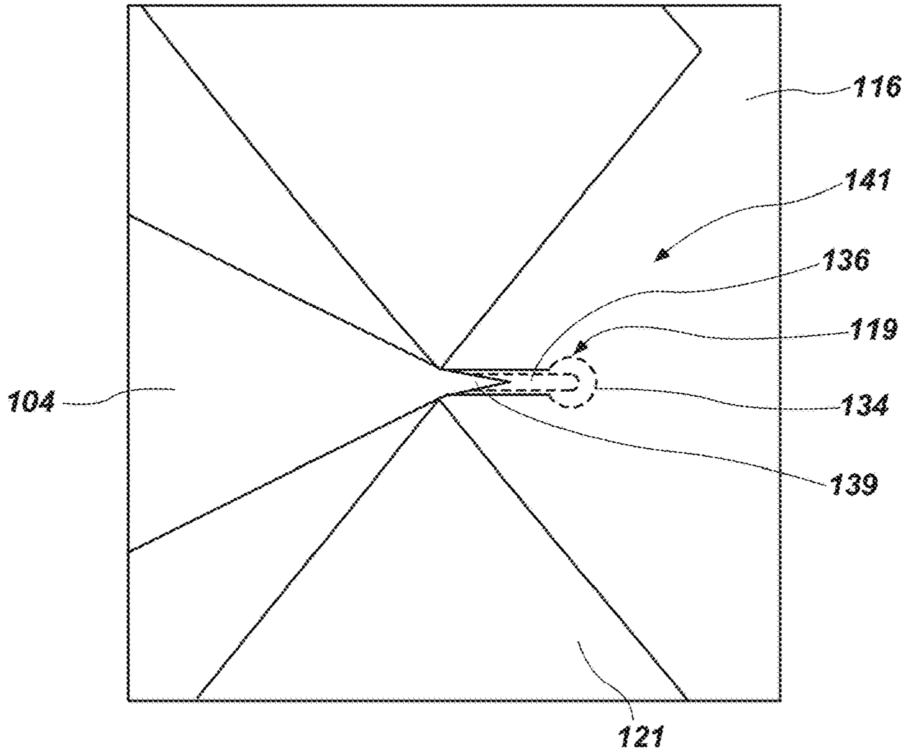
FIG. 15F is a side view of the fairing component depicting a conductive shield, a termination pattern, and elongated triangle-shaped notches.

FIG. 15A is a perspective view of a cable assembly 114 of the antenna assembly 102 according to one or more embodiments of the present disclosure. FIG. 15B is an enlarged, partial cross-sectional view of the cable assembly 114 according to one or more embodiments of the present disclosure. FIG. 15C is a cross-sectional view of a cable assembly 114 mounted to the connection ring 106. FIG. 15D is a perspective view of a cable assembly 114 operably coupled to an antenna element 118 according to one or more embodiments of the present disclosure. FIG. 15E is another cross-sectional view of the cable assembly 114 mounted to the connection ring 106. FIG. 15F is a side view of the fairing component 104 depicting the conductive shield 141, the termination pattern 121, and the elongated triangle-shaped notches 139. Some portions of FIGS. 15E and 15F have been made transparent to better depict internal components.

Referring to FIGS. 15A-15D together, in some embodiments, the cable assembly 114 includes a front connector 172, an aft connector 174, and coaxial cable 176 extending between the front connector 172 and the aft connector 174. The front connector 172 may include an outer contact 178, an inner contact 180, a retainer element 182, a shim 184, a first spring element 188, a second spring element 186, an upper insulator portion 190, and a lower insulator portion 192. The coaxial cable 176 may include an outer conductor 194, an insulator sleeve 196, and an inner conductor 198. The aft connector 174 may be configured to span an outer wall of the aerial vehicle 100 and is described in greater detail below in regard to FIGS. 16A and 16B. In some embodiments, the cable assembly 114 may not include an aft connector but may include a second connector that spans the outer wall of the aerial vehicle 100, and the second connecter may be connected anywhere as dictated by the design (e.g., convenient to the design) of the antenna assembly 102 and/or the aerial vehicle 100.

In some embodiments, the outer contact 178 of the front connector 172 may be operably coupled of the outer conductor 194 of the coaxial cable 176, and the inner contact 180 of the front connector 172 may be operably coupled of the inner conductor 198 of the coaxial cable 176. In some embodiments, the outer contact 178 may have a general cylindrical shape and may define an inner chamber 179. The inner contact 180 may be at least partially disposed within the inner chamber 179 (i.e., the outer contact 178 may house at least a portion of the inner contact 180), and the inner contact 180 may have a cylinder shape (e.g., a shaft shape) and may be translatable axially within the inner chamber 179 of the outer contact 178. Furthermore, in one or more embodiments, the outer contact 178 and the inner contact 180 may share a center longitudinal axis 181. For instance, outer contact 178 and inner contact 180 may be generally concentric to each other. Additionally, the upper insulator portion 190 may be disposed around the inner contact 180 and between the inner contact 180 and the outer contact 178 of the front connector 172. Likewise, the lower insulator portion 192 may be disposed around the inner conductor 198 of the coaxial cable 176 and between inner conductor 198 of the coaxial cable 176 and the outer contact 178 of the front connector 172.

In one or more embodiments, the retainer element 182 may have a receiving aperture 183 through which the outer contact 178 and inner contact 180 may be inserted. Additionally, the retainer element 182 may be sized and shaped to be inserted into and fastened within a respective receiving structure of the plurality of receiving structures 144*a*, 144*b*, 144*c* of the connection ring 106. For instance, the retainer element 182 may have a circular center portion 202 and two opposing wing portions 204, 206. The circular center portion 202 of the retainer element 182 in conjunction with the outer contact 178 and the inner contact 180 may be sized and shaped to be inserted into stepped-circular recess 146 of a given receiving structure 144*a*, and the two opposing wing portions 204, 206 of the retainer element 182 may be sized and shaped to be inserted into the opposing wing recesses 152, 154 of the given receiving structure 144*a*. Furthermore, the retainer element 182 may be fastened to the connection ring 106 via fasteners 208*a*, 208*b* extending through apertures in the retainer element 182 aligned with the fastener receiving apertures 156, 158 of the given receiving structure 144*a*. In alternative embodiments, the plurality of receiving structures 144*a*, 144*b*, 144*c* may include a threaded aperture into which an outer threaded nut may be threaded, and which may retain a connector to the connection ring 106.

Furthermore, as is depicted in FIGS. 15C-15E, when the cable assembly 114 is fastened to connection ring 106, the outer contact 178 may align with and contact a region (i.e., a first region of the launch portion 119) of the fairing component 104 (and coating 116) immediately surrounding the general circular slot portion 134 of the first and second slot lines 117*a*, 117*b* (i.e., the launch portion 119 of the antenna element 118) through the aperture 148 of the connection ring 106, and the inner contact 180 may align with and contact the connector contact region 136 (i.e., a second region of the launch portion 119) of the antenna element 118 through the aperture 148 of the connection ring 106.

In some embodiments, the outer contact 178 of the cable assembly 114 may include a partial annular protrusion 210 extending radially outward from a body of the outer contact 178. Additionally, the shim 184 and the second spring element 186 may be disposed between the partial annular protrusion 210 of the outer contact 178 and the retainer element 182. As a result, the outer contact 178 of the cable assembly 114 may be biased in an axial direction of the outer contact 178 relative to the retainer element 182 such that, when fastened to the connection ring 106, the outer contact 178 is biased toward and is pushed against the fairing component 104 (e.g., the coating 116 formed on the fairing component 104). In one or more embodiments, the second spring element 186 may include one or more spring washers (e.g., Belleville spring washers). In other embodiments, the second spring element 186 a plurality of compression springs (e.g., coil springs).

Additionally, in some embodiments, the first spring element 188 may be coupled to the inner contact 180, and the first spring element 188 may be disposed between the inner contact 180 and the outer contact 178 of the cable assembly 114. As a result, the inner contact 180 of the cable assembly 114 may be biased relative to the outer contact 178 of the cable assembly 114, which is biased relative to the retainer element 182, which is affixed to the connection ring 106. Furthermore, as noted above, the outer contact 178 may define the inner chamber 179 along which the inner contact 180 and the upper insulator portion 190 may translate axially relative to the outer contact 178. Because the inner contact 180 is biased relative to the outer contact 178, and because the outer contact 178 is biased relative to a remainder of the antenna assembly 102, when the cable assembly 114 is fastened to the connection ring 106, the cable assembly 114 may at least substantially maintain contact between the inner contact 180 and the connector contact region 136 of the antenna element 118.

In some embodiments, the first spring element 188 may include a compression spring. For example, the first spring element 188 may include coil spring. In other embodiments, the first spring element 188 may include volute spring or a collection a washer springs.

Biasing the inner contact 180 relative to the outer contact 178 and biasing the outer contact 178 relative to a remainder of the antenna assembly 102 may decrease a likelihood of the inner contact 180 and the outer contact 178 losing contact with the connector contact region 136 of the antenna element 118 and the fairing component 104, respectively. Furthermore, biasing the inner contact 180 relative to the outer contact 178 and biasing the outer contact 178 relative to a remainder of the antenna assembly 102 may improve a contact between the inner contact 180 and the connector contact region 136 of the antenna element 118 relative to a rigid or unbiased contact. Additionally, biasing the inner contact 180 relative to the outer contact 178 and biasing the outer contact 178 relative to a remainder of the antenna assembly 102 may maintain contact between the inner contact 180 and the connector contact region 136 of the antenna element 118 during aerial operations. Moreover, biasing the inner contact 180 relative to the outer contact 178 and biasing the outer contact 178 relative to a remainder of the antenna assembly 102 may improve the contact between a flat surface of the longitudinal end of the inner contact 180 and a curved surface of the connector contact region 136 of the antenna element 118, which is formed from the inner surface of the fairing component 104.

Additionally, having a biased connection between the contacts of the cable assembly 114 and the antenna element 118 further facilitates the antenna assembly 102 to operate in relatively high temperatures. For example, a common solder connection would likely melt in temperatures above 600° F. even when using high temperature solder alloys. Likewise, a welded connection would ruin coating 116 (e.g., conductive coating) and would likely render the antenna element 118 inoperable. Therefore, the biased connection between the contacts of the cable assembly 114 and the antenna element 118 at least partially enables antenna assembly 102 to maintain structural and operational integrity in relatively high temperatures.

Referring still to FIGS. 15A-15F, in some embodiments, the outer contact 178 may include a recess 214 formed in an upper portion of the outer contact 178 configured to contact the region of the fairing component 104 (and coating 116) immediately surrounding the general circular slot portion 134 of the first and second slot lines 117*a*, 117*b*. The recess 214 may extend axially into the outer contact 178. When the cable assembly 114 is fastened to the connection ring 106, the recess 214 may align with the connector contact region 136 of the antenna element 118, thus preventing the outer contact 178 from shorting on the connector contact region 136 of the antenna element 118.

Additionally, the outer contact 178 may include a notch 216 formed in the partial annular protrusion 210 of the outer contact 178. The notch 216 may be configured to align with (e.g., receive) the alignment pin 150 of the connection ring 106. Put another way, the outer contact 178 may be keyed. The notch 216 of the outer contact 178 and alignment pin 150 of the connection ring 106 may assist in properly aligning the recess 214 of the outer contact 178 with the connector contact region 136 of the antenna element 118, which as described above, will prevent the outer contact 178 from shorting on the connector contact region 136 of the antenna element 118.

Figure 16A:
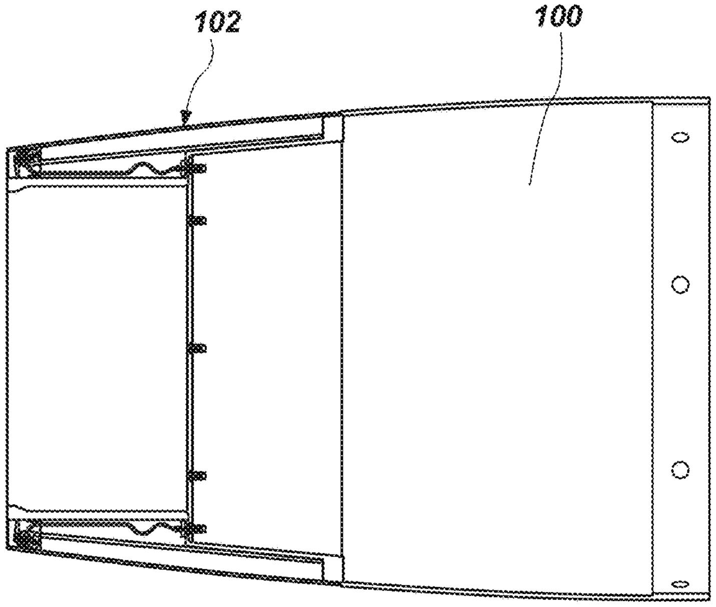
FIG. 16A is a side cross-sectional view of an antenna assembly mounted to a portion of an aerial vehicle.
Figure 16B:
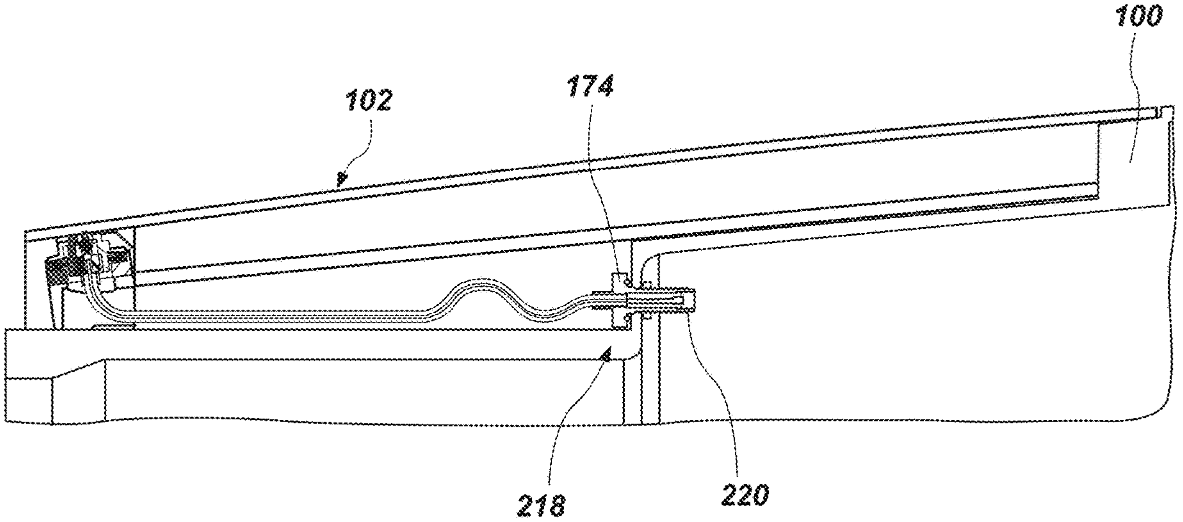
FIG. 16B is an enlarged cross-sectional view of an antenna assembly mounted to the portion of the aerial vehicle.

FIG. 16A is a side cross-sectional view of the antenna assembly 102 mounted to a portion of an aerial vehicle 100. FIG. 16B is an enlarged cross-section view of the antenna assembly 102 mounted to the portion of the aerial vehicle 100. Referring to FIGS. 16A and 16B together, in some embodiments, when the cable assembly 114 is mounted to the connection ring 106, the aft connector 174 may span an exterior wall 218 of the aerial vehicle 100. Furthermore, the aft connector 174 may provide an electromagnetic interference gasket that isolates the exterior of the aerial vehicle 100 from an interior of the aerial vehicle 100. In some embodiments, the aft connector 174 may provide a threaded connection 220 for coupling the cable assembly 114 to a control system of the aerial vehicle 100.

Referring to FIGS. 1-16B together, the antenna assembly 102 of the present disclosure may provide advantages over conventional antenna assemblies. For example, because the antenna assembly 102 maintains structural and operational integrity at relatively high temperatures, the antenna assembly 102 increases operations that can be performed by vehicles and/or bodies (e.g., the aerial vehicle 100) to which the antenna assembly 102 is attached and with which the antenna assembly 102 is utilized. For instance, the vehicles and/or bodies (e.g., the aerial vehicle 100) can be subjected to environments having increased temperatures in comparison to conventional antenna assemblies. Furthermore, the antenna assembly 102 may maintain functionality of the antenna assembly 102 in high temperatures, and as a result, radio frequency communication with external components/controllers, even when subjected to unexpected high temperatures, is maintained. As a result, the antenna assembly 102 provides an increased reliability in comparison to conventional antenna assemblies. Moreover, the antenna assembly 102 increases a number of applications (e.g., uses) of the antenna assembly 102 in comparison to conventional antenna assemblies.

Figure 17:
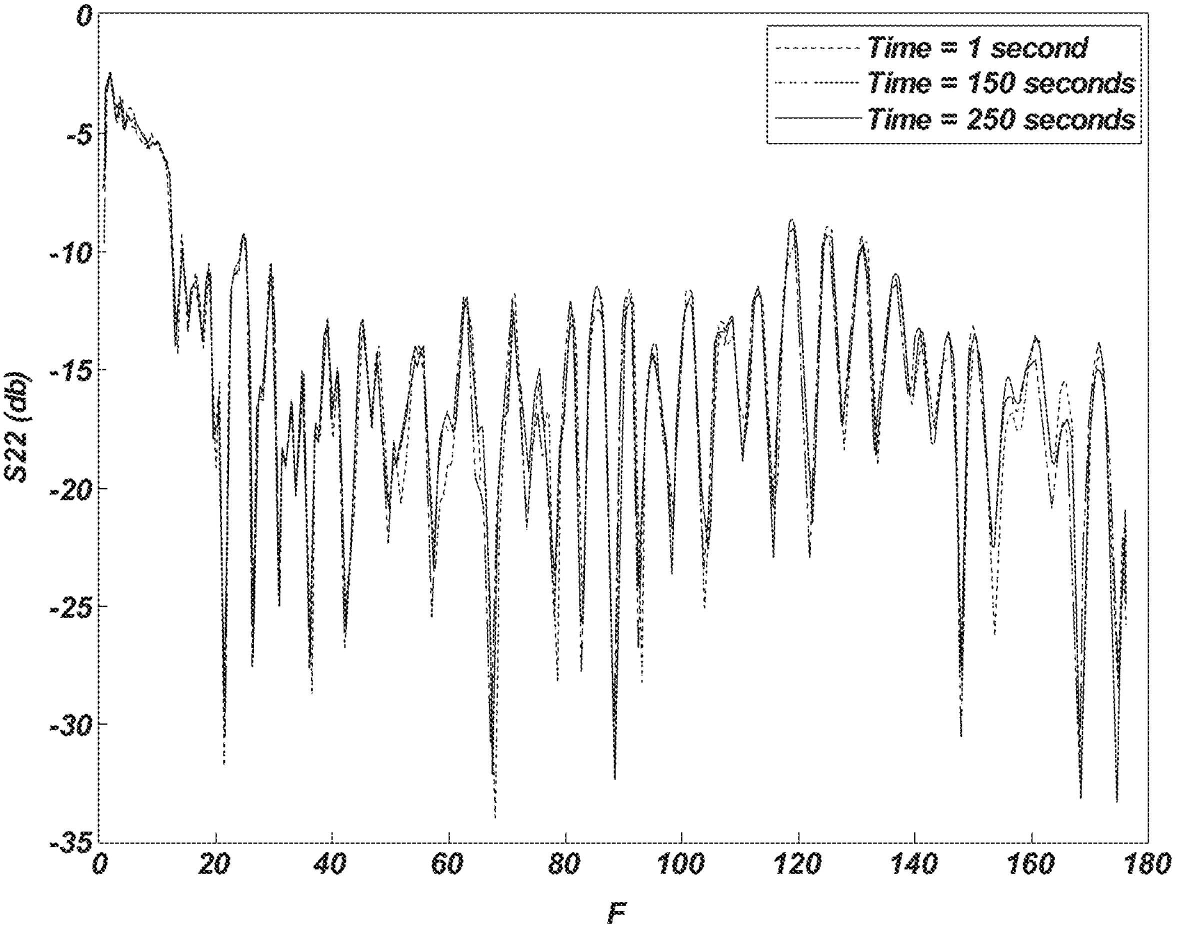
FIG. 17 shows a plot depicting an example S-parameter amplitude plotted against times corresponding to before, during, and at an end of a temperature cycling of an antenna assembly according to one or more embodiments of the present disclosure.
Figure 18:
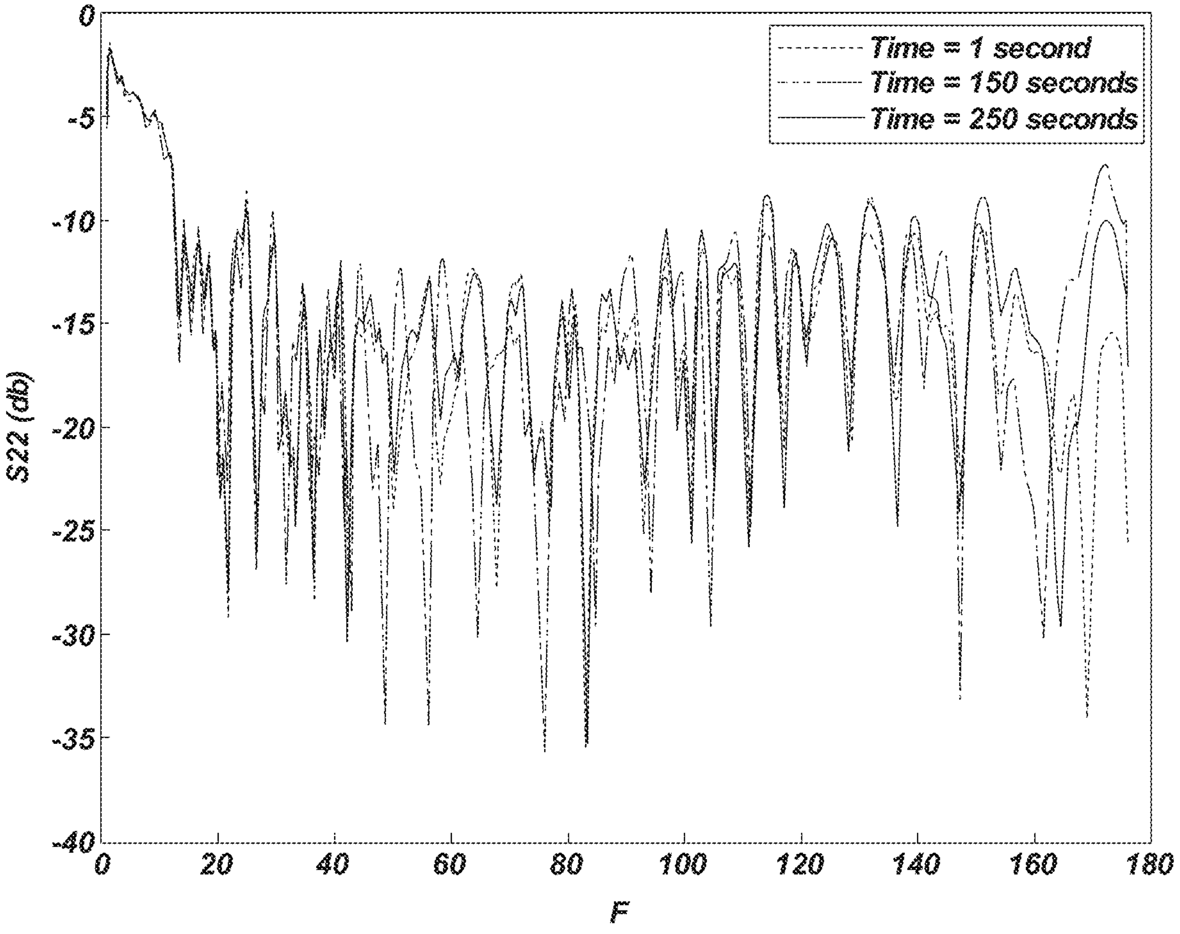
FIG. 18 shows a plot depicting an example S-parameter amplitude plotted against times corresponding to before, during, and at an end of a temperature cycling of an antenna assembly according to one or more embodiments of the present disclosure.

FIGS. 17 and 18 include plots showing an example S-parameter amplitude (in this case, the s22 parameter amplitude) plotted at times corresponding to before, during, and at an end of a temperature cycling of an antenna assembly according to one or more embodiments of the present disclosure obtained via testing done by the inventors. FIGS. 17 and 18 show that the performance of antenna assembly did not appreciably change during thermal ramping of the antenna assembly. For instance, FIGS. 17 and 18 show about 1 to 2 dB of change on average with larger fluctuations attributable to environmental changes and aerial vehicle movements during the text.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternate useful combinations of the elements described, will become apparent to those skilled in the art from the description. Such modifications and embodiments also fall within the scope of the appended claims and equivalents.

What is claimed is:

1. An antenna assembly for an aerial vehicle, the antenna assembly comprising:

a fairing component comprising a hollow body;

a conductive coating on at least an inner surface of the fairing component;

a plurality of antenna elements in the conductive coating, each antenna element comprising:

a first slot line defining a first transmission line; and a second slot line defining a second transmission line;

an inner sleeve positioned within the fairing component, the inner sleeve comprising a wall including two overlapping portions that overlap circumferentially and are configured to be free to move circumferentially relative to one another, at least one of the two overlapping portions offset radially relative to a remainder of the wall; and a plurality of cable assemblies operably coupled to the plurality of antenna elements.

2. An antenna assembly for an aerial vehicle, the antenna assembly comprising:

a fairing component comprising a hollow body;

a conductive coating on at least an inner surface of the fairing component;

a plurality of antenna elements in the conductive coating, each antenna element comprising:

a first slot line defining a first transmission line; and a second slot line defining a second transmission line;

a sleeve within the fairing component, the sleeve comprising multiple pieces defining seams therebetween, the seams positioned between and circumferentially offset from antenna elements on the fairing component; and a plurality of cable assemblies operably coupled to the plurality of antenna elements.

* * * * *